US010397200B2

United States Patent
Lu et al.

(10) Patent No.: US 10,397,200 B2
(45) Date of Patent: Aug. 27, 2019

(54) CARD-BASED DYNAMIC PASSWORD GENERATION METHOD AND DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitan Technologies Co., Ltd., Beijing (CN)

( * ) Notice: Subject to any disclaimer, the term of this patent is extended or adjusted under 35 U.S.C. 154(b) by 175 days.

(21) Appl. No.: 15/529,130

(22) PCT Filed: Nov. 23, 2015

(86) PCT No.: PCT/CN2015/095270
§ 371 (c)(1),
(2) Date: May 24, 2017

(87) PCT Pub. No.: WO2016/107332
PCT Pub. Date: Jul. 7, 2016

(65) Prior Publication Data
US 2017/0295149 A1 Oct. 12, 2017

(30) Foreign Application Priority Data
Dec. 30, 2014 (CN) .......................... 2014 1 0840454

(51) Int. Cl.
*H04L 29/06* (2006.01)
*G06F 21/45* (2013.01)
(Continued)

(52) U.S. Cl.
CPC .............. *H04L 63/06* (2013.01); *G06F 21/31* (2013.01); *G06F 21/44* (2013.01); *G06F 21/45* (2013.01);
(Continued)

(58) Field of Classification Search
CPC ..... H04L 63/06; H04L 9/3234; H04L 9/3228; H04L 63/0853; H04L 63/0838; H04L 63/0846; G06K 7/0013; G06F 21/44; G06F 21/45; G06F 21/31; G06F 2221/2115
See application file for complete search history.

(56) References Cited

U.S. PATENT DOCUMENTS

| 9,710,635 B2 * | 7/2017 | Hoornaert | G06F 21/34 |
| 2008/0110983 A1 * | 5/2008 | Ashfield | G06Q 20/24 235/382 |

(Continued)

FOREIGN PATENT DOCUMENTS

GB 2442249 * 2/2008 ............ G06F 21/20

*Primary Examiner* — Matthew Smithers
(74) *Attorney, Agent, or Firm* — Hammer & Associates, P.C.

(57) ABSTRACT

A card-based method for generating a dynamic password, in which the method comprises: power on a device, initialize a current running state as a first state, prompt a user to press down a mode key, the device determines an operation to be executed when the mode key is pressed down, obtain input data according to the operation on a number key pressed by the user in the case that a number key is pressed down; obtain a confirm state according to the operation on a state key pressed by the user in the case that a state key is pressed down; otherwise, execute a corresponding operation according to the current running state, the corresponding operation comprises: obtain a dynamic password according to the interaction with the card and preset process the password data and output the dynamic password. According to the invention, both internal data of the card held by the user and information input by the user take part in the generation of the dynamic password, thus, the password data is formed to protect from being manipulated so as to make the process of generating a dynamic password more secure.

18 Claims, 7 Drawing Sheets

(51) Int. Cl.
*G06K 7/00* (2006.01)
*G06F 21/31* (2013.01)
*G06F 21/44* (2013.01)
*H04L 9/32* (2006.01)

(52) U.S. Cl.
CPC .......... *G06K 7/0013* (2013.01); *H04L 9/3228* (2013.01); *H04L 9/3234* (2013.01); *H04L 63/0838* (2013.01); *H04L 63/0846* (2013.01); *H04L 63/0853* (2013.01); *G06F 2221/2115* (2013.01)

(56) References Cited

U.S. PATENT DOCUMENTS

| | | | |
|---|---|---|---|
| 2008/0201264 A1* | 8/2008 | Brown | G06Q 20/3674 705/67 |
| 2010/0082966 A1* | 4/2010 | Lu | G06F 21/34 713/2 |
| 2010/0098246 A1 | 4/2010 | Ward | |
| 2010/0127083 A1* | 5/2010 | Brown | G07F 7/0806 235/492 |
| 2010/0280957 A1* | 11/2010 | Gullberg | G06F 21/34 705/72 |
| 2011/0101109 A1* | 5/2011 | Bona | G06K 19/07709 235/492 |
| 2011/0140841 A1* | 6/2011 | Bona | G06K 19/06187 340/5.83 |
| 2012/0260324 A1* | 10/2012 | Lenon | G06Q 20/38 726/6 |
| 2012/0305654 A1* | 12/2012 | Wang | G06K 19/0707 235/492 |
| 2014/0040628 A1* | 2/2014 | Fort | G06F 21/34 713/182 |
| 2015/0310422 A1* | 10/2015 | Ronca | G06Q 20/341 235/380 |

\* cited by examiner

CARD-BASED DYNAMIC PASSWORD GENERATION METHOD AND DEVICE

FIELD OF THE INVENTION

The present invention relates to a card-based method for generating a dynamic password and a device thereof, which belongs to the field of identify authentication.

PRIOR ART

As development of the Internet, more and more activities must be finished via the Internet, such as E-bank, telephone bank; thus, network information security becomes more and more close to people's interests. Under this circumstances, the technology of identify authentication is developed, and a dynamic password, which is safer than a static-password, becomes more popular.

Generally, a dynamic password is generated by a sever and is sent to a user in a form of text message or e-mail, or a dynamic password is generated by a dynamic token (OTP) obtained by a user. However, at the moment the rights and interests of a user will be damaged in the case that the text massage or the e-mail is intercepted illegally, the dynamic token is used by an illegal user, or data is interpolated; or in the case that the user logs in a phishing website or the input dynamic password is intercepted.

SUMMARY OF THE INVENTION

The object of the present invention is to provide a card-based method for generating a dynamic password and a device thereof, which generates a dynamic password by using a card obtained by a user and a device for generating a dynamic password, and the dynamic password generated by this way is more secure.

Thus, according one aspect of the invention, there is provided a card-based method for generating a dynamic password, in which the card is inserted into a device, wherein the method comprises following steps:

Step S1, powering on the device, and initializing a current running state as a first state;

Step S2, determining, by the device, an operation which is to be executed, executing Step S3 in the case that the operation is on number keys; executing Step S4 in the case that the operation is on state keys; otherwise, executing Step S5;

Step S3, determining, by the device, whether it needs to input numbers, if yes, obtaining input data according to the operation on number keys pressed by a user, and returning to execute Step S2; otherwise, returning to execute Step S2 directly;

Step S4, determining, by the device, whether it needs to input a confirm state, if yes, obtaining the confirm state according to the operation on state keys pressed down by the user, and then returning to execute Step S2; otherwise, returning to execute Step S2 directly; and Step S5, determining, by the device, the current running state;

powering on the card in the case that the current running state is the first state, sending a preset instruction to the card after the card is powered on successfully, and obtaining a first data and a second data from a first returned data returned by the card and saving the first data and the second data, updating the current running state as a sixth state, and returning to execute Step S2;

prompting the user to input a PIN code in the case that the current running state is the sixth state, storing input data as the PIN code when the confirm state is OK, updating the current running state as a seventh state, and returning to Step S2;

obtaining the stored PIN code in the case that the current running state is the seventh state, generating a verifying-PIN-code instruction and sending the instruction to the card, updating the current state as an eighth state after the card verifies the PIN code successfully, and then returning to Step S2;

generating a password-generating instruction and sending the instruction to the card according to the saved first data and data stored in a preset cache in the case that the current running state is the eighth state, obtaining password data from a second returned data returned by the card and verifying the password data, updating the current running state as a ninth state after the obtained password data is verified successfully, and then returning to Step S2; and compressing the password data according to the saved second data in the case that the current running state is the ninth state, formatting the compressed data to obtain a dynamic password, displaying the dynamic password, powering off the card, initializing the current running state as the first state, and returning to Step S2.

Preferably, after the current running state is determined in Step S5, the step may further include:

prompting the user to input a challenge code in the case that the current running state is a second state, and obtaining the input data when the confirm state is OK, and storing the input data into the preset cache, updating the current running state as the sixth state, and then returning to execute Step S2; correspondingly, the updating the current running state as the sixth state is replaced with updating the current running state as the second state when the current running state is determined as the first state.

Preferably, when the current running state is determines as the first state, the method further includes: setting a currency flag according to the first returned data returned by the card; after the current running state is determined in Step S5, the step further includes:

determining whether the currency flag is set in the case that the current running state is a third state, if yes, prompting the user to input a currency serial number, and obtaining the input data when the confirm state is OK, and storing the input data into the preset cache, updating the current running state as a fourth state, and then returning to Step S2; otherwise, updating the current running state as the fourth state, and then returning to Step S2;

prompting the user to input an amount of money in the case that the current running state is the fourth state, obtaining the input data and storing the input data into the preset cache when the confirm state is OK, updating the current running state as the sixth state, and returning to Step S2;

correspondingly, the updating the current running state as the sixth state is replaced with updating the current running state as the third state when the current running state is determined as the second state.

Preferably, after the current running state is determined in Step S5, the step further includes:

prompting the user to input a signature value in the case that the current running state is a fifth state, obtaining the input data and storing the data into the preset cache when the confirm state is OK, updating the current running state as the sixth state, and then returning to Step S2; correspondingly, the updating the current running state as the sixth state is replaced with updating the current running state as the fifth state when the current running state is the first state.

Preferably, Step S1 may further include: prompting the user to choose a mode key, obtaining a collection of running states which corresponds to a mode chosen by the user when the mode key is pressed, and then executing Step S2; determining the current running state in Step S5 specifically is determining an obtained current running state which is in the collection of running states.

Preferably, the obtained collection of running states corresponding to the mode which is chosen by the user can include: the first state, the sixth state, the seventh state, the eighth state and the ninth state; include: the first state, the second state, the sixth state, the seventh state, the eighth state and the ninth state; include: the first state, the second state, the third state, the fourth state, the sixth state, the seventh state, the eighth state and the ninth state; or include: the first state, the fifth state, the sixth state, the seventh state, the eighth state and the ninth state.

Preferably, determining whether it needs to input numbers in Step S3 specifically includes: determining whether a number inputting flag is 1, if yes, it needs to input numbers; otherwise, it does not need to input numbers; obtaining the input data according to the operation on number keys pressed by the user in Step S3 specifically includes:

Step 3-1, determining whether a digit counting flag is smaller than a preset value, if yes, plus 1 to the digit counting flag, updating the input data according to a value in a number inputting cache, and then executing Step 3-2; otherwise, prompting that a max for inputting is reached, initializing the digit counting flag as 0, clearing the number inputting cache, and then executing Step 3-2;

Step 3-2, setting a key flag as 0.

Preferably, determining whether it needs to input the confirm state in Step S4 specifically includes: determining whether the digit counting flag is lager than 0, if yes, it needs to input the confirm state, otherwise, it does not need to input the confirm state; obtaining the confirm state according to the operation on the state keys pressed by the user in Step S4 specifically includes:

Step 4-1, determining a value of the key flag, setting a confirm flag as 1 in the case that the value of the key flag is a fifth preset value, clearing the number inputting cache, initializing the digit counting flag as 0, and executing Step 4-4; executing Step 4-2 in the case that the value of the key flag is a sixth preset value;

Step 4-2, determining whether the digit counting flag is 0, if yes, setting the confirm flag as 2, and executing Step 4-4; otherwise, executing Step 4-3;

Step 4-3, clearing a value in the number inputting cache, updating the input data, subtracting 1 from the digit counting flag, controlling the display screen to display a backspace, and then executing Step 4-4;

Step 4-4, setting the key flag as 0;

in which, the confirm flag=1 means the obtained confirm state is OK, the confirm flag=2 means the obtained confirm state is Cancel, the confirm flag=0 means it waits for obtaining the confirm state.

According to another aspect of the present invention, there is provided a device for generating a dynamic password based on a card, in which the device includes keys, a display screen, as well as following functional modules:

an initializing module, which is configured to initialize the current running state as the first state after the device is powered on;

a first determining module, which is configure to determine an operation which to be executed, and determine whether it needs to input numbers, and determine whether it needs to input a confirm state;

a first processing module, which is configured to obtain input data according to the operation on the number keys pressed by an user when the first determining module determines that the operation, which is to be executed, is the operation on number keys and numbers need to be input; and obtain the confirm state according to the operation on the state keys pressed by the user when the first determining module determines that the operation to be executed is the operation on state keys and the confirm state needs to be input;

a second determining module, which is configured to determine the current running state when the first determining module determines that the operation to be executed is neither an operation of inputting number keys nor an operation on state keys;

a second processing module, which is configured to power on the card when the second determining module determines that the current running state is the first state, send a preset instruction to the card in the case that the card is powered on successfully, and obtain the first data and the second data from the first returned data returned by the card and save the first data and the second data, and update the current running state as the sixth state;

a third processing module, which is configure to prompt the user to input a PIN code when the second determining module determines that the current running state is the sixth state, and store the current input data obtained by the first processing module as the PIN code when the current confirm state obtained by the first processing module is OK, and update the current running state as the seventh state;

a fourth processing module, which is configured to obtain the stored PIN code when the second determining module determines that the current running state is the seventh state, generate the verifying-PIN-code instruction and send the instruction to the card, and update the current running state as the eighth state after the PIN code is verified successfully by the card;

a fifth processing module, which is configured to generate a password-generating instruction according to the first data and the data stored in the preset cache and send the instruction to the card when the second determining module determines that the current running state is the eighth state, obtain the password data from the second returned data returned by the card and verify the password data, and update the current running state as the ninth state after the password data is verified successfully; and a sixth processing module, which is configured to compress the password data according to the saved second data in the case that the second determining module determines that the current running state is the ninth state, and format the compressed data to obtain a dynamic password, and display the dynamic password, power off the card and initialize the current running state as the first state.

Preferably, the device further includes a seventh processing module, which is configured to prompt the user to input the challenge code when the second determining module determines that the current running state is the second state, obtain the input data and store the input data into the preset cache when the confirm state is OK, and update the current running state as the sixth state;

specifically, the second processing module is configured to power on the card when the second determining module determines that the current running state is the first state, send a preset instruction to the card in the case that the card is powered on successfully, obtain the first data and the second data from the first returned data returned by the card and save the first data and the second data, and update the current running state as the second state.

Preferably, the device further includes an eighth processing module and a ninth processing module, the eighth processing module is configured to determine whether the currency flag is set when the second determining module determines that the current running state is the third state, if yes, prompt the user to input the currency serial number, and obtain the input data and store the input data into the preset cache in the case that the confirm state is OK, and update the current running state as the fourth state; otherwise, update the current running state as the fourth state;

the ninth processing module is configured to prompt the user to input the amount of money when the second determining module determine that the current running state is the fourth state, and obtain the input data and store the input data into the preset cache in the case that the confirm state is OK, and update the current running state as the sixth state;

specifically, the second processing module is configured to power on the card when the second determining module determines that the current running state is the first state, send the preset instruction to the card in case the card is powered on successfully, and obtain the first data and the second data from the first returned data returned by the card and save the first data and the second data, and set the currency flag according to the first returned data returned by the card, and update the current running state as the second state;

specifically, the seventh processing module is configured to prompt the user to input a challenge code when the second determining module determines that the current running state is the second state, and obtain the input data and store the input data into the preset cache when the confirm state is OK, and update the current running state as the third state.

Preferably, the device further includes a tenth processing module, which is configured to prompt the user to input a signature value when the second determining module determines that the current running state is the fifth state, and obtain the input data and store the input data into the preset cache when the confirm state is OK, and update the current running state as the sixth state;

specifically, the second processing module is configured to power on the card when the second determining module determines that the current running state is the first state, send the preset instruction to the card after the card is powered on successfully, and obtain the first data and the second data from the first returned data returned by the card and save the first data and the second data, and update the current running state as the fifth state.

Preferably, the initializing module is further configured to initialize a corresponding relation between a value of mode flag and the collection of running states, and control the display screen to prompt the user to press down a mode key; obtain a collection of running states, which is corresponding to the mode key, according to the mode key when the mode key is pressed down; the initializing module is further configured to initialize the current running state in each collection of running states as the first state; the second determining module is specifically configured to determine the current running state in the collection of running states which is obtained by the initializing module.

Specifically, the initializing module is configured to initialize the collection of running states, corresponding to a mode flat whose value is a first preset value, as a collection which includes the first state, the sixth state, the seventh state, the eighth state and the ninth state, and/or initialize the collection of running states, corresponding to a mode flat whose value is a second preset value, as a collection which includes the first state, the second state, the sixth state, the seventh state, the eighth state and the ninth state, and/or initialize the collection of running states, corresponding to a mode flag whose value is a third preset value, as a collection which includes the first state, the second state, the third state, the fourth state, the sixth state, the seventh state, the eighth state and the ninth state, and/or initialize a collection of running states, corresponding to a mode flag whose value is a fourth preset state, as a collection which includes the first state, the fifth state, the sixth state, the seventh state, the eighth state and the ninth state.

Furthermore, the initializing module is configured to initialize the digit counting flag as an initial value; the first determining module is configured to determine whether the number inputting flag is set, if yes, it needs to input numbers; otherwise, it does not need to input numbers; the first processing module is further configured to determine whether the digit counting flag is smaller than a preset value when the first determining module determines that the operation which is to be executed is operation on number keys and it needs to input numbers, if yes, plus 1 to the digit counting flag, update the input data according to the value in the number inputting cache; otherwise, control the display screen to display a max for inputting is reached, initialize the digit counting flag as the initial value, clear the number inputting cache, and set the key flag as a default value.

Furthermore, the initializing module is configured to initialize the number inputting flag as a second value, and initialize the digit counting flag as the initial value; the first determining module is further configured to determine whether the digit counting flag is larger than the initial value, if yes, it needs to input the confirm state, otherwise, it does not need to input the confirm state; the first processing module is further configured to determine a value of the key flag when the first determining module determines that the operation which is to be executed is the operation on state keys and it needs to input the confirm state, set a confirm flag as a first value in the case that the value of the key value is the fifth preset value, clear the number inputting cache, initial the digit counting flag as the initial value and set the key flag as the default value; determine whether the digit counting flag is the initial value in the case that the value of the key flag is the sixth preset value, if yes, set the confirm flag as a third value and set the key flag as the default value; otherwise, clear a value in the number inputting cache, update the input data, subtract 1 from the digit counting flag, control the display screen to display the backspace, and set the key flag as the default value.

According to the present invention, the card held by the user takes part in the process of generating a dynamic password so as to ensure that an identity of a holder of the device for generating a dynamic password is legitimate; the data is protected from being manipulated because the information input by the user takes part in the process of generating the dynamic password; and the dynamic password is protected from being intercepted in the process of being sent from the sever to the user because the dynamic password is generated at the side of the user.

DETAILED DESCRIPTION OF THE PRESENT INVENTION

Figure 1:
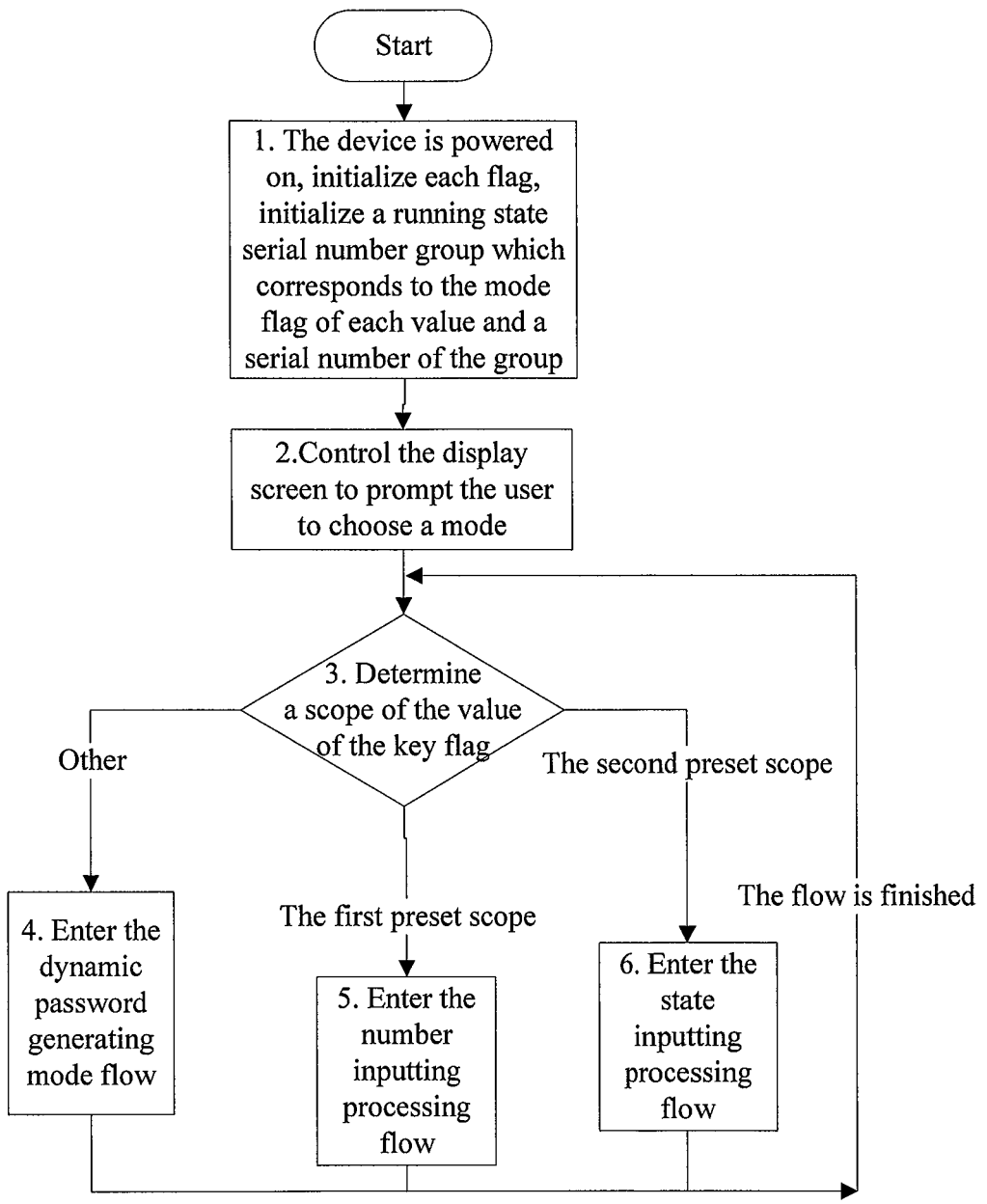
FIG. 1 is a flow chart of a card-based method for generating a dynamic password according to Embodiment 2 of the present invention.

More details about the present invention are given with drawings as follows.

Embodiment 1

The present Embodiment 1 provides a card-based method for generating a dynamic password, which needs a user, a card and a device for generation a dynamic password; in which, the device for generating a dynamic password can be a terminal device which can interact with a card, in the present Embodiment the terminal device is a card reader, for example, and the card reader has a display screen, number keys (number keys 0-9 for instance), state keys (canceling key and OK key for instance) and mode keys (like OTP (one-time password or dynamic password) mode key), first of all, the user inserts the card into the card reader, and the card-based method for generating an dynamic password includes:

Step S1, the card reader is powered on, and a current running state is initialized as a first state;

specifically, the card reader is powered on automatically when a card is inserted in the card reader.

Step S2, the card reader determines an operation which is to be executed, Step S3 is executed in the case that the operation to be executed is an operation on number keys; Step S4 is executed in the case that the operation to be executed is an operation on state keys; otherwise, Step S5 is executed;

preferably, the card reader, combining with a key interrupt flow and a interrupt processing flow, can determine a type of a key which is pressed down, so as to determine the operation which is to be executed according to the type of the key which is pressed down; for instance, the operation to be executed is on number keys in the case that a number key is pressed down, and Step S3 is executed; the operation to be executed is on state keys in the case that a state key is pressed down, and Step S4 is executed; otherwise, Step S5 is executed.

The key interrupt flow specifically includes: a key interrupt is entered when a key is pressed down, a key IO interrupt flag is set, and the key interrupt is exited from.

The interrupt processing flow specifically includes: an interrupt processing is entered when the key IO interrupt flag is set, a value of a key flag is set according to keys input by the user, and a value is written into a number inputting cache according to the value of the key flag, and the interrupt processing is exited from after the key IO interrupt flag is cleared.

Furthermore, it means that a number key is pressed down in the case that the value of the key flag belongs to a first preset scope; and it means that a state key is pressed down in the case that the value of the key flag belongs to a second preset scope; for instance, the first preset scope is from 0x01 to 0x0A, which corresponds to number keys from 0 to 9 respectively; the second preset scope is from 0x0B to 0x0C, which corresponds to the OK key and the Cancel key respectively.

Step S3, the card reader determines whether it needs to input numbers, if yes, input data is obtained according to the operation on number keys pressed down by the user, and then Step S2 is returned to; otherwise, Step S2 is returned to directly;

specifically, in the flow of the present invention, whether it needs to input numbers is determined according to a value of a number inputting flag, for instance, it needs to input numbers in the case that the value of the number inputting flag is 1; while it does not need to input numbers in the case that the value of the number inputting flag is 0. Preferably, Step S1 further includes initializing the number inputting flag as 0, and initializing a digit counting flag as 0, in which, the a value of the digit counting flag indicates the digits of the numbers entered by the user.

Step S3 specifically is sub-flow of the operation executed by the card reader, which includes:

Step 1-1, the value of the number inputting flag is determined, Step 1-2 is executed in the case that the value of the number inputting flag is 1; Step 1-3 is executed in the case that the value of the number inputting flag is 0;

Step 1-2, whether the digit counting flag is smaller than a preset value is determined, if yes, plus 1 to the value of the digit counting flag, and update the input data according to the value in the number inputting cache, and then execute Step 1-4; otherwise, prompt that a max for inputting is reached, and execute Step 1-3;

Step 1-3, the digit counting flag is initialized as 0, the number inputting cache is cleared and Step 1-4 is executed;

for instance, an initial value of the digit counting flag is 0.

Step 1-4, the key flag is set as 0, and Step S2 is returned to.

For instance, a default value of the key flag equals 0.

Step S4, the card reader determines whether it needs to input a confirm state, if yes, the confirm state is obtained according to the operation on the state keys pressed by the user, and then Step S2 is returned to; otherwise, Step S2 is returned to directly;

specifically, in the flow of the present invention, whether it needs to input the confirm state is determined by determining whether the digit counting flag is larger than 0, if yes, it needs to input the confirm state; otherwise, it does not need to input the confirm state. Preferably, Step S1 further includes initializing a confirm flag as 0.

Step S4 specifically is a sub-flow of the operation executed by the card reader, the card reader can obtain the confirm state according to a value of the confirm flag, for instance, the confirm state is OK in the case that the value of the confirm flag is 1, the confirm state is Cancel in the case that the value of the confirm flag is 2, and the confirm state waits for being obtained in the case that the value of the confirm flag is 0.

The specific flow of Step S4 includes following steps:

Step 2-1, whether the digit counting flag is larger than 0 is determined, if yes, Step 2-2 is executed; otherwise, Step 2-5 is executed;

Step 2-2, the value of the key flag is determined, the confirm flag is set as 1 in the case that the value of the key flag is a fifth preset value, the number inputting cache is cleared, the digit counting flag is initialized as 0, and Step 2-5 is executed; Step 2-3 is executed in the case that the value of the key flag is a sixth preset value;

for instance, the fifth preset value is 0x0B, the sixth preset value is 0x0C. The initial value of the digit counting flag is 0.

Step 2-3, whether the digit counting flag is 0 is determined, if yes, the confirm flag is set as 2, and Step 2-5 is executed; otherwise, Step 2-4 is executed;

Step 2-4, a value in the number inputting cache is cleared, and the input data is updated, subtract 1 from the value of the digit counting flag, and the display screen displays a backspace;

specifically, the input data is updated by using the data in the number inputting cache which is left after the operation of clear.

Step 2-5, the key flag is set as 0, and Step S2 is executed. For instance, the default value of the key flag is 0.

Step S5, the card reader determines the current running state;

the card is powered on in the case that the current running state is the first state, a preset instruction is sent to the card after the card is powered on successfully, and a first data and a second data are obtained from a first returned data which is returned by the card and the first data and the second data are saved, the current running state is updated as a sixth state, and then Step S2 is returned to;

the user is prompted to input a PIN code in the case that the current running state is the sixth state, and the input data is stored as the PIN code when the confirm state is OK, the current running state is updated as a seventh state, and then Step S2 is returned to;

the stored PIN code is obtained in the case that the current running state is the seventh state, and a verifying-PIN-code instruction is generated and sent to the card, and the current running state is updated as an eighth state after the card verifies the PIN code successfully, and then Step S2 is returned to;

a password generating instruction is generated according to the first data saved and data stored in a preset cache and is sent to the card in the case that the current running state is the eighth state, password data is obtained from a second returned data returned from the card and is verified, and the current running state is updated as a ninth state after the password data is verified successfully, and Step S2 is returned to;

the password data is compressed according to the second data saved in the case that the current running state is the ninth state, and the compressed data is formatted to obtain a dynamic password, the password dynamic is displayed, and the card is powered off, and the current running state is initialized as the first state, and then Step S2 is returned to.

The card reader in the present Embodiment 1 at least can support one mode-based dynamic password-generating-way, for instance, the dynamic password-generating-way based on a first preset mode is realized via the running of five states which are included in Step S5.

Furthermore, based on a way for generation a dynamic password, which just only supports a second preset mode, Step S5 is replaced with determining the current running state;

the card is powered on in the case that the current running state is the first state, the preset instruction is sent to the card after the card is powered on successfully, the first data and the second data are obtained from the first returned data returned by the card and saved, and the current running state is updated as a second state, and then Step S2 is returned to;

the user is prompted to input a challenge code in the case that the current running state is the second state, the input data is obtained and stored into the preset cache when the confirm state is OK, and the current running state is updated as the sixth state, and then Step S2 is returned to;

the user is prompted to input a PIN code in the case that the current running state is a sixth state, and the input data is stored as the PIN code when the confirm state is OK, and the current running state is updated as the seventh state, and then Step S2 is returned to;

the stored PIN code is obtained in the case that the current running state is the seventh state, the verifying-PIN-code instruction is generated and sent to the card, and the current running state is updated as the eighth state when the PIN code is verified successfully by the card, and then Step S2 is returned to;

the dynamic password generating instruction is generated according to the saved first data and the data stored in the preset cache in the case that the current running state is the eighth state, and the instruction is sent to the card, the password data is obtained from the second returned data returned by the card and is verified, and the current running state is updated as the ninth state after the password data is verified successfully, and then Step S2 is returned to;

the password data is compressed according to the saved second data in the case that the current running state is the ninth state, and the compressed data is formatted to obtain a dynamic password, the dynamic password is displayed, the card is powered off, the current running state is updated as the first state, and then Step S2 is returned to.

Furthermore, based on a way for generating a dynamic password, which just only supports a third preset mode, Step S5 is replaced with determining the current running state;

the card is powered on in the case that the current running state is the first state, the preset instruction is sent to the card after the card is powered on, and the first data and the second data are obtained from the first returned data returned by the card and saved, a currency flag is set according to the first returned data returned by the card, and the current running state is updated as the second state, and then Step S2 is returned to;

the user is prompted to input a challenge code in the case that the current running state is the second state, the input data is obtained and stored into the preset cache when the confirm state is OK, and the current running state is updated as a third state, and then Step S2 is executed;

whether the currency flag is set is determined in the case that the current running state is the third state, if yes, prompt the user to input a currency serial number, and the input data is obtained and stored into the preset cache when the confirm state is OK, the current running state is updated as a fourth state, and then Step S2 is executed; otherwise, the current running state is updated as the fourth state, and then Step S2 is executed;

the user is prompted to input amount of money in the case that the current running state is the fourth state, the input data is obtained and stored into the preset cache when the confirm state is OK, the current running state is updated as the sixth state, and then Step S2 is executed;

the user is prompted to input a PIN code in the case that the current running state is the sixth state, and the input data is stored as the PIN code when the confirm state is OK, the current running state is updated as the seventh state, and then Step S2 is executed;

the stored PIN code is obtained in the case that the current running state is the seventh state, a verifying-PIN-code instruction is generated and sent to the card, and the current running state is updated as the eighth state when the PIN code is verified successfully, and then Step S2 is executed;

a dynamic password generating instruction is generated according to the stored first data and the data stored in the preset cache and is sent to the card in the case that the current running state is the eighth state, the password data is obtained from the second returned data returned by the card and is verified, and the current running state is updated as the ninth state after the password data is verified successfully, and then Step S2 is executed;

specifically, in the present Embodiment 1, the dynamic password generating instruction is generated according to the saved first data and is sent to the card, and the password data obtained from the second returned data returned by the card can be a dynamic password generated by a counter inside the card in the case that there is no data in the preset cache. The verification in the present step means a format of the password data is verified, for instance, whether the format of the obtained data conforms to the TLV format is determined.

The password data is compressed according to the saved second data in the case that the current running state is the ninth state, and the compressed data is formatted to obtain a dynamic password, the dynamic password is displayed, and the card is powered off, the current running state is initialized as the first state, and then Step S2 is executed.

Furthermore, based on a way for generating a dynamic password, which just only supports a fourth preset mode, Step S5 is replaced with determining the current running state;

the card is powered on in the case that the current running state is the first state, the preset instruction is sent to the card after the card is powered on successfully, and the first data and the second data are obtained from the first returned data returned by the card and saved, the current running state is updated as a fifth state, and then Step S2 is executed;

the user is prompted to input a signature value in the case that the current running state is the fifth state, and the input data is obtained and stored into the preset cache when the confirm state is OK, and the current running state is updated as the sixth state, and then Step S2 is executed;

the user is prompted to input a PIN code in the case that the current running state is the sixth state, the input data is stored as the PIN code when the confirm state is OK, and the current running state is updated as the seventh state, and then Step S2 is executed;

the stored PIN code is obtained in the case that the current running state is the seventh state, and a verifying-PIN-code instruction is generated and sent to the card, and the current running state is updated as the eighth state when the PIN code is verified successfully by the card, and then Step S2 is executed;

the dynamic password generating instruction is generated according to the saved first data and the data stored in the preset cache and is sent to the card in the case that the current running state is the eighth state, the password data is obtained from the second returned data returned by the card and is verified, and the current running state is updated as the ninth state after the password data is verified successfully, and then Step S2 is executed;

the password data is compressed according to the saved second data in the case that the current running state is the ninth state, and the compressed data is formatted to obtain a dynamic password, and the dynamic password is displayed, and the card is powered off, and the current running state is initializing as the first state, and then Step S2 is executed.

Furthermore, a way for generating a dynamic password, which can support several modes, can be realized by installing mode keys in a card reader for a user to choose a dynamic password generating mode, in that case, steps from Step S1 to Step S5, provided in the present Embodiment 1, need to be adjusted as follow:

Step S1 further includes: the user is prompted to press down a mode key, and Step S2 is executed when a mode key is pressed down, furthermore, in the present step, Step S2 is executed in the case that a mode key is pressed down; the card reader has no response in the case that another key is pressed or no key is pressed down. As above mentioned, the card reader can determine a type of the key which is pressed down by combining a key interrupt flow and an interrupt processing flow, specifically, a mode key is pressed down in the case that a value of the key flag belongs to a third preset scope, for instance, the third preset scope is from 0xA1 to 0xA4, and the values of the key flag are 0xA1, 0xA2, 0xA3 and 0xA4 which correspond a first preset mode, a second preset mode, a third preset mode and a fourth preset mode respectively.

Step S1 further includes initializing a corresponding relation between a value of a mode flag and a collection of running states, and initializing the current running state as the first state specifically includes: initializing the current running state of each collection of running states as the first state;

for instance, the collection of running states, which corresponds to the mode flag whose value is 0xA1, is initialized as a collection which includes the first state, the sixth state, the seventh state, the eighth state and the ninth state, and/or the collection of running states, which corresponds to the mode flag whose value is 0xA2, is initialized as a collection which includes the first state, the second state, the sixth state, the seventh state, the eighth state and the ninth state, and/or the collection of running states, which corresponds to the mode flag whose value is 0xA3, is initialized as a collection which includes the first state, the second state, the third state, the fourth state, the sixth state, the seventh state, the eighth state and the ninth state, and/or the collection of running states, which corresponds to the mode flag whose value is 0xA4, is initialized as a collection which includes the first state, the fifth state, the sixth state, the seventh state, the eighth state and the ninth state.

When a mode key is pressed down, the method further includes: a corresponding collection of running states is obtained according to the mode flag; determining the current running state in Step S5 specifically is determining a current running state under the obtained collection of running states.

Embodiment 2

On base of Embodiment 1, Embodiment 2 provides a specific implementation process of a card-based method for generating an OTP, and the method supports four modes, as shown in FIG. 1, the process includes:

Step 1, a device is powered on, every flag is initialized, and a running state code group, which corresponds to a mode flag of each value, and a serial number of the running state code group are initialized;

specifically, the value of each flag in the present Embodiment 2 is initialized as 0; a running state code group, which corresponds to a mode flag whose value is 0xA1, is initialized as {0x01, x0x06, x0x07, 0x08, 0x09}, and the serial number of the running state code group is initialized as 0; a running state code group, which corresponds to a mode flag whose value is 0xA2, is initialized as {0x01, 0x02, x0x06, x0x07, 0x08, 0x09}, and the serial number of the running state code group is initialized as 0; a running state code group, which corresponds to a mode flag whose value is 0xA3, is initialized as {0x01, 0x02, 0x03, 0x04, x0x06, x0x07, 0x08, 0x09}, and the serial number of the running state code group is initialized as 0; a running state code group, which corresponds to a mode flag whose value is 0xA4, is initialized as {0x01, 0x05, x0x06, x0x07, 0x08, 0x09}, and the serial number of the running state code group is initialized as 0. Specifically, the serial number corresponds to a state code in each running state code group, for instance, for the running state code group {0x01, 0x02, x0x06, x0x07, 0x08, 0x09}, the serial number 0 corresponds to 0x01, the serial number 1 corresponds to 0x02, and the serial number 2 corresponds to 0x06, the rest can be done in the same manner.

Step 2, a display screen is controlled to prompt a user to choose a mode;

in the present Embodiment 2, modes for the user to choose include: mode 1, mode 2, mode 3 and mode 4, and each mode corresponds to a mode key, in which, if the value of the mode flag is 0x0A, the corresponding mode is mode 1 in Embodiment 2, if the value of the mode flag is 0xA2, the corresponding mode is mode 2, if the value of the mode flag is 0xA3, the corresponding mode is mode 3, and if the value of the mode flag is 0xA4, the corresponding mode is mode 4.

Step 3, a value scope of a key flag is determined, Step 5 is executed in the case that the value scope is a first preset scope; Step 6 is executed in the case that the value scope is a second preset scope; and Step 4 is executed the value scope is else scope;

specifically, the first preset scope is from 0x01 to 0x0A, which corresponds number keys from 0 to 9; and the second preset scope is from 0x0B to 0x0C, which corresponds to an OK key and a Cancel key.

Figure 2:
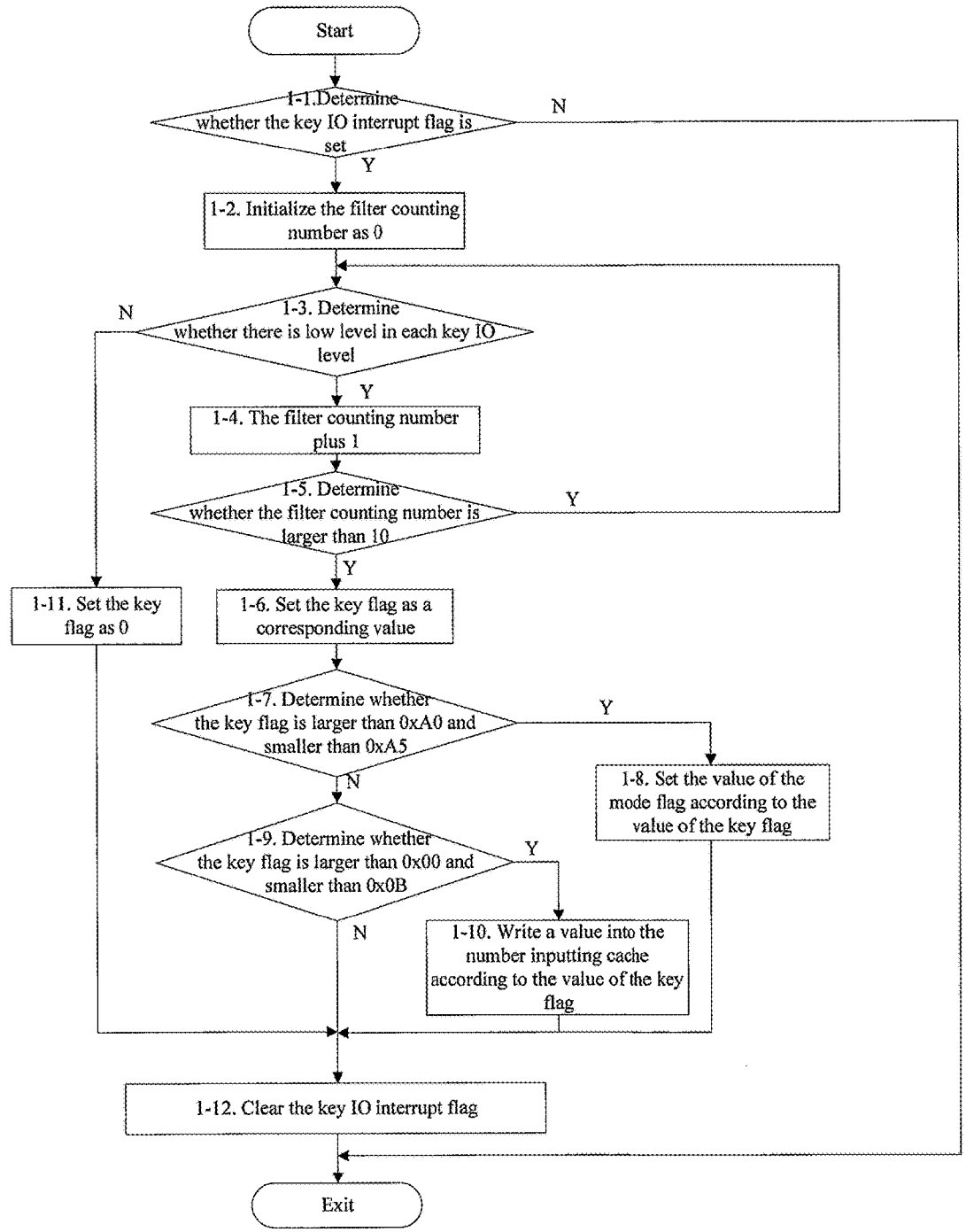
FIG. 2 is a flow chart of a key interrupt processing according to Embodiment 2 of the present invention.

Furthermore, the flow provided in Embodiment 2 further includes a key interrupt process flow, as shown in FIG. 2, which includes:

Step 1-1, whether an key-IO-interrupt flag is set is determined, if yes, Step 1-2 is executed; otherwise, exit from the flow;

Step 1-2, a filter counting number is initialized as 0;

Step 1-3, whether there is low level in each key IO level is determined, if yes, Step 1-4 is executed; otherwise, Step 1-11 is executed;

Step 1-4, plus 1 to the filter counting number;

Step 1-5, whether the filter counting number is larger than 10 is determined, if yes, Step 1-6 is executed; otherwise, Step 1-3 is executed;

Step 1-6, the key flag is set as a corresponding value; for instance, the key flag is set as 0x01 in the case that the number key 0 is pressed down is detected; and the key flag is set as 0x0B in the case that the confirm key is pressed down is detected.

Step 1-7, whether the key flag is larger than 0xA0 and smaller than 0xA5 is determined, if yes, Step 1-8 is executed; otherwise, Step 1-9 is executed;

Step 1-8, the value of the mode flag is set according to the value of the key flag, and then Step 1-12 is executed;

specifically, to set the value of the mode flag=0xA1 in the case that the value of the key flag is 0xA1; to set the value of the mode flag=0xA2 in the case that the value of the key flag is 0xA2; to set the value of the mode flag=0xA3 in the case that the value of the key flag is 0xA3; to set the value of the mode flag=0xA4 in the case that the value of the key flag is 0xA4.

Step 1-9, whether the key flag is larger than 0x00 and smaller than 0x0B is determined, if yes, Step 1-10 is executed; otherwise, Step 1-12 is executed;

Step 1-10, a value is written into a number inputting cache according to the value of the key value, and then Step 1-12 is executed;

specifically, 1 is written into the number inputting cache in the case that the value of the key flag is 0x01; 2 is written into the number inputting cache in the case that the value of the key flag is 0x02; 3 is written into the number inputting cache in the case that the value of the key flag is 0x03; 4 is written into the number inputting cache in the case that the value of the key flag is 0x04; 5 is written into the number inputting cache in the case that the value of the key flag is 0x05; 6 is written into the number inputting cache in the case that the value of the key flag is 0x06; 7 is written into the number inputting cache in the case that the value of the key flag is 0x07; 8 is written into the number inputting cache in the case that the value of the key flag is 0x08; 9 is written into the number inputting cache in the case that the value of the key flag is 0x09.

Step 1-11, the key flag is set as 0, and then Step 1-12 is executed;

Step 1-12, the key-IO-interrupt flag is cleared, and exit from the flow.

Specifically, that the key-IO-interrupt flag is cleared means resetting the key-IO-interrupt flag.

Step 4, a dynamic-password-generating-mode flow is entered, and Step 3 is returned after the flow is finished;

Step 5, a number-inputting process flow is entered, and Step 3 is returned after the flow is finished;

Step 6, a state-inputting process flow is entered, and Step 3 is returned after the flow is finished.

Figure 3A:
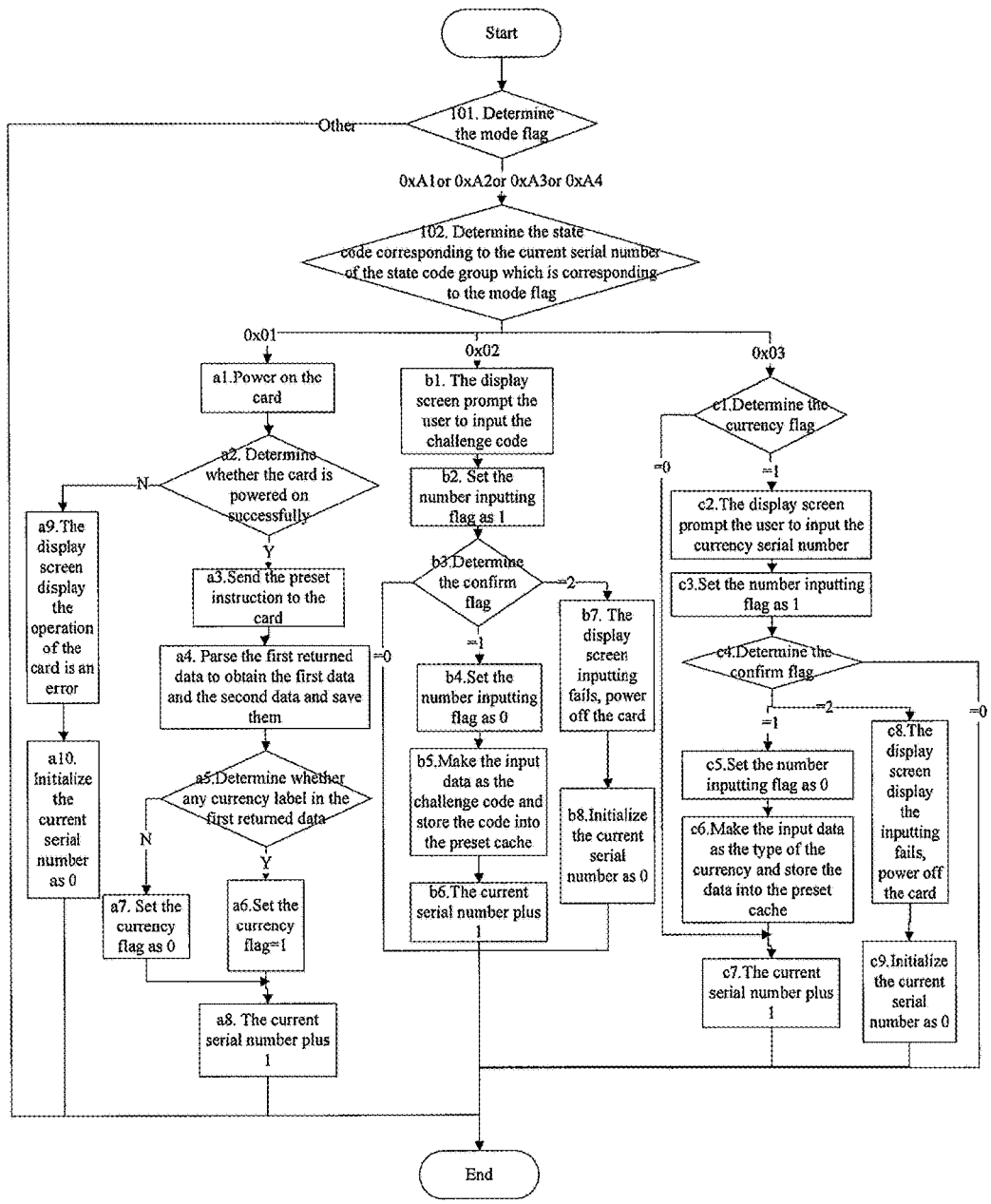
FIGS. 3a-3c are flow charts of a dynamic password generating mode flow in FIG. 1.
Figure 3B:
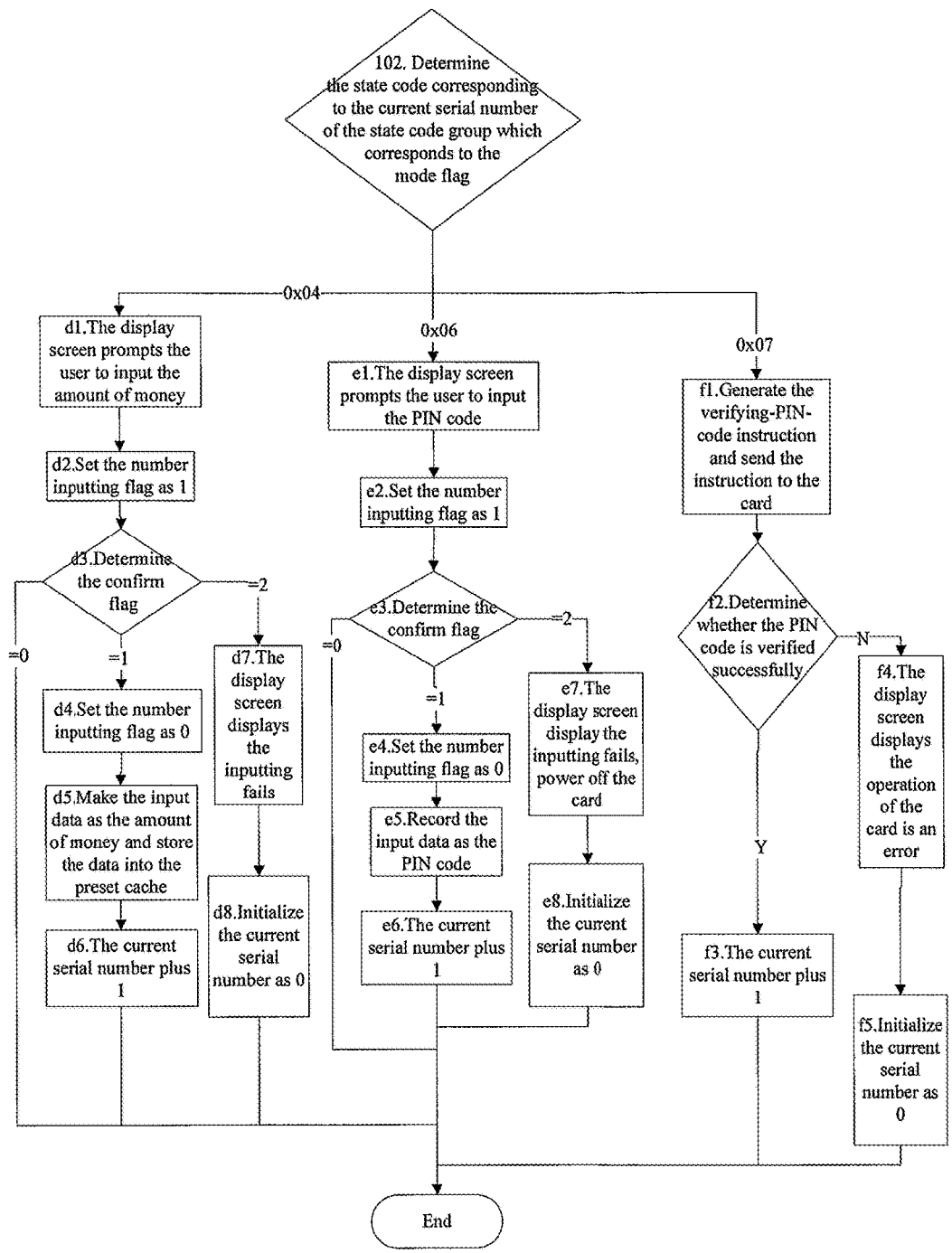
Figure 3C:
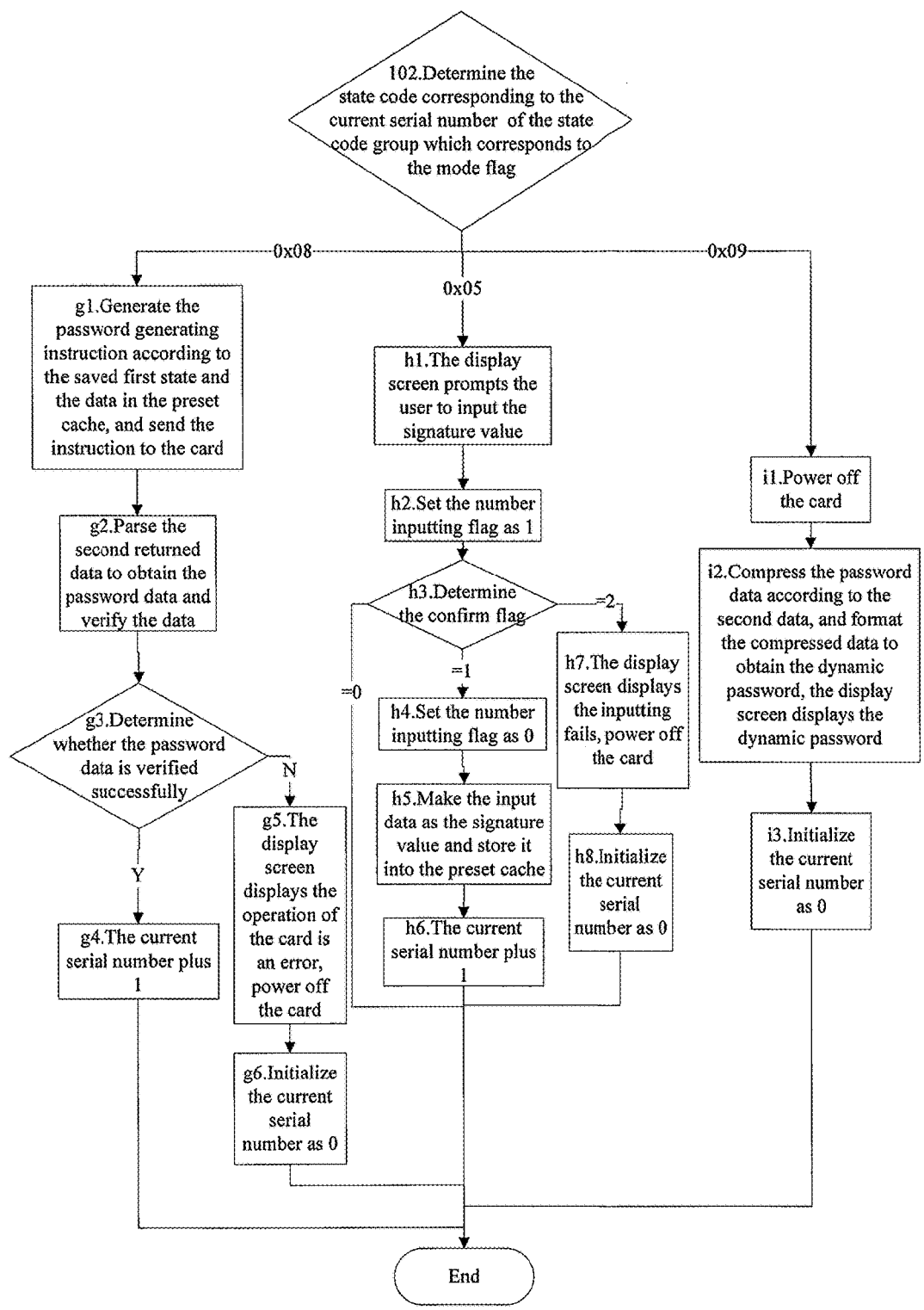

The dynamic password generating flow in Step 4, as shown in FIGS. 3a-3c, includes following steps:

Step 101, the mode flag is determined, Step 102 is executed in the case that the mode flag is 0xA1, 0xA2, 0xA3 or 0xA4; the flow is finished in the case that the mode flag is other value;

Step 102, a state code, corresponding to the current serial number of the state code group which corresponds to the mode flag, is determined, Step a1 is executed in the case that the state code is 0x01; Step b1 is executed in the case that the state code is 0x02; Step c1 is executed in the case that the state code is 0x03; Step d1 is executed in the case that the state code is 0x04; Step e1 is executed in the case that the state code is 0x06; Step f1 is executed in the case that the state code is 0x07; Step g1 in the case that the state code is 0x08; Step f1 is executed in the case that the state code is 0x05; Step i1 is executed in the case that the state code is 0x09;

Step a1, the card is powered on;

Step a2, whether the card is powered on successfully is determined, if yes, Step a3 is executed; otherwise, Step a9 is executed;

Step a3, a preset instruction is sent to the card;

preferably, sending the preset instruction to the card specifically includes: a first preset command is sent to the card, and a second preset command is composed according to a data group which is obtained from response data of the first preset command, and the second preset command is sent to the card, and a third preset command is composed according to a data group which is obtained from response data of the second preset command, and then the third preset command is sent to the card.

For instance, the first preset command is an application-choosing command whose data field includes a value preset by a issuer, and the data obtained from the response data of the first preset instruction is PDOL (Processing Part of Data Information). The second preset command is an application-initializing command whose data field includes PDOL, and the data obtained from the response data of the second preset command is AFL (Application File Locator Information). The third preset command is a reading-application command whose data field includes AFL, and a first data and a second data can be obtained from the response data of the third preset command.

Step a4, a first returned data returned by the card is parsed to obtain the first data and the second data and save the first data and the second data;

specifically, Step a4 includes: the first returned data returned by the card is parsed, and the first data (CDOL which is application data inside card) is obtained according to a first identifier and a second identifier in the first returned data which is returned by the card and the first data is saved, and the second data (IPB which is Issuer Property Bitmap) is obtained according a third identifier and the second data is saved;

preferably, in the present Embodiment 2, the first identifier is 0x8c, the second identifier is 0x8d, the third identifier is 0x9F56; and Step a4 specifically includes: the first returned data returned by the card is parsed, a length of the first data is obtained according to a byte of value which is after the first identifier, data, which is after the byte of value and whose bit length equals the length of the first data, is obtained by intercepting and made as a first part of the first data; a length of the second data is obtained according to a byte of value which is after the second identifier, and data, which is after the byte of value and whose bit length equals the length of the second data, is obtained by intercepting as a second part of the first data, and the first part and the second part are jointed in sequence to obtain the first data and the first data is saved; the length of the second data is obtained according a byte of value which is after the third identifier, data, which is after the byte of value and whose bit length equals the length of the second data is obtained by intercepting and made as the second data and the second data is saved.

For instance, the first returned data returned by the card is 0x8c 06 9F 33 03 9F 4E 14 8d 08 A0 00 00 03 33 01 01 01 9F 56 03 9F 4E 14 90 00, and the first data, which is obtained by intercepting according to the first identifier 0x8c, the length of the first data 0x06, the second identifier 0x8d and the length of the second data 0x08, is 0x9F 33 03 9F 4E 14 A0 00 00 03 33 01 01 01, and the second data, which is obtained by intercepting according to the third identifier 0x9F56, is 03 9F 4E 14.

Step a5, whether there is a currency label in the first returned data returned from the card is determined, if yes, Step a6 is executed; otherwise, Step a7 is executed;

for instance, an identification which indicates the currency label is 0x8e, and Step a5 further includes whether the first returned data returned by the card includes 0x8e is determined, if yes, Step a6 is executed; otherwise, Step a7 is executed.

Step a6, a currency flag is set as 1, and then Step a8 is executed;

Step a7, the currency flag is set as 0, and then Step a8 is executed;

Step a8, 1 is added to a current serial number, and the flow is finished;

Step a9, the display screen is controlled to display the operation by the card is an error;

Step a10, the current serial number is initialized as 0, and the flow is finished;

Step b1, the display screen is controlled to prompt the user to input a challenge code;

Step b2, a number-inputting flag is set as 1;

Step b3, a confirm flag is determined, Step b4 is executed in the case that the confirm flag equals 1; Step b7 is executed in the case that the confirm flag equals 2; the flow is finished in the case that the confirm flag equals 0;

Step b4, the number-inputting flag is set as 0;

Step b5, the input data is made as the challenge code and stored into a preset cache;

Step b6, 1 is added to the current serial number, end;

Step b7, the display screen is controlled to display that inputting is failure, and the card is powered off;

Step b8, the current serial number is initialized as 0, ending the flow.

Step c1, the currency flag is determined, Step c2 is executed in the case that the currency flag equals 1; Step c7 is executed in the case that the currency flag equals 0;

Step c2, the display screen is controlled to prompt the user to input a currency serial number;

Step c3, the number-inputting flag is set as 1;

Step c4, the confirm flag is determined, Step c5 is executed in the case that the confirm flag equals 1; Step c8 is executed in the case that the confirm flag equals 2; the flow is finished in the case that the confirm flag equals 0;

Step c5, the number-inputting flag is set as 0;

Step c6, the input data is made as a type of currency and stored into the preset cache;

Step c7, 1 is added to the current serial number, and the flow is finished;

Step c8, the display screen is controlled to display inputting is failure, and the card is powered off;

Step c9, the current serial number is initialized as 0, and the flow is finished.

Step d1, the display screen is controlled to prompt the user to input amount of money;

Step d2, the number-inputting flag is set as 1;

Step d3, the confirm flag is determined, Step d4 is executed in the case that the confirm flag equals 1; Step d7 is executed in the case that the confirm flag equals 2; the flow is finished in the case that the confirm flag equals 0;

Step d4, the number-inputting flag is set as 0;

Step d5, the input data is made as the amount of money and is stored into the preset cache;

Step d6, 1 is added to the current serial number, and the flow is finished;

Step d7, the display screen is controlled to display inputting is failure, and the card is powered off;

Step d8, the current serial number is initialized as 0, and the flow is finished.

Step e1, the display screen is controlled to prompt the user to input a PIN code;

Step e2, the number-inputting flag is set as 1;

Step e3, the confirm flag is determined, Step e4 is executed in the case that the confirm flag equals 1, Step e7 is executed in the case that the confirm flag equals 2, the flow is finished in the case that the confirm flag equals 0;

Step e4, the number-inputting flag is set as 0;

Step e5, the input data is recorded as the PIN code;

Step e6, 1 is added to the current serial number, and the flow is finished;

Step e7, the display screen is controlled to display inputting is failure, and the card is powered off;

Step e8, the current serial number is initialized as 0, and the flow is finished.

Step f1, a verifying-PIN-code instruction is generated according to the PIN code, and the verifying-PIN-code instruction is sent to the card;

specifically, a format of the verifying-PIN-code instruction which is sent to the card is 0x00 20 00 80 nn PIN code, in which, nn means a length of the PIN code.

Step f2, whether the PIN code is verified successfully is determined, if yes, Step f3 is executed; otherwise, Step f4 is executed;

specifically, whether the PIN code is verified successfully is determined according to a returned value returned by the card, for example, the PIN code is verified successfully in the case that 0x9000 is returned by the card; otherwise, the PIN code is verified unsuccessfully.

Step f3, 1 is added to the current serial number, and the flow is finished;

Step f4, the display screen is controlled to display the operation by the card is an error;

Step f5, the current serial number is initialized as 0, and the flow is finished.

Step g1, the dynamic password generating instruction is generated according to the first saved data and data stored in the preset cache, and the dynamic password generating instruction is sent to the card;

specifically, in Embodiment 2, a format of the dynamic password generating instruction, which is generated according to the first data and the data stored in the preset cache, is 0x80AE8000 nn the first data in the case that the current mode flag is 0xA1, in which, nn means the length of the first data (CDOLData).

The format of the dynamic password generating instruction, which is generated according to the first data and the data stored in the preset cache, is 0x80AE8000 nn CDOL-Data+the challenge code in the case that the current mode flag is 0xA2, in which, nn means CDOLData+the length of the challenge code.

The format of the dynamic password generating instruction, which is generated according to the first data and the data stored in the preset cache, is 0x80AE8000 nn CDOL-Data+the challenge code+the amount of money and the type of currency in the case that the current mode flag is 0xA3, in which, nn means the length of CDOLData+the challenge code+the amount of money and the type of currency.

The format of the dynamic password generating instruction, which is generated according to the first data and the data stored in the preset cache, is 0x80AE8000 nn CDOL-Data+a signature value in the case that the current mode flag is 0xA4, in which, nn means the length of CDOLData+the signature value.

Step g2, a second returned data returned by the card is parsed to obtain password data and the password data is verified;

furthermore, in the case that the mode flag is 0xA4, Step g2 further includes: the saved signature value is performed on an encoding operation by using the password data, which is obtained from the second returned data returned by the card, as a key, and a result obtained from the encoding operation is made as new password data.

Step g3, whether the password data is verified successfully is determined, if yes, Step g4 is executed; otherwise, Step g5 is executed;

specifically, determine whether the password data conforms to a TLV format, if yes, the password data is verified successfully; otherwise, the password data is verified unsuccessfully.

Step g4, 1 is added to the current serial number, and the flow is finished;

Step g5, the display screen is controlled to display an operation by the card is an error, and the card is powered off;

Step g6, the current serial number is initialized as 0, and the flow is finished.

Step h1, the display screen is controlled to prompt the user to input a signature value;

Step h2, the number-inputting flag is set as 1;

Step h3, the confirm flag is determined, Step h4 is executed in the case that the confirm flag is 1; Step h7 is executed in the case that the confirm flag is 2; the flow is finished in the case that the confirm flag is 0;

Step h4, the number-inputting flag is set as 0;

Step h5, the input data is made as the signature value and stored into the preset cache;

Step h6, 1 is added to the current serial number, and the flow is finished;

Step h7, the display screen is controlled to display inputting fails, and the card is powered off;

Step h8, the current serial number is initialized as 0, and the flow is finished;

Step i1, the card is powered off;

Step i2, the password data is compressed according to the saved second data, and the compressed data is formatted to obtain a dynamic password, and the display screen is controlled to display the dynamic password;

Specifically, in Embodiment 2, that the password data is compressed according to the saved second data includes: a bit value, which corresponds to a bit address whose median is 1, is chosen from data of the data field of the password data to recombine a binary data, if number of bytes of the recombined binary data is less than the number of bytes of an integer, a zero is filled in higher order.

For instance, the second data is 00010100001111110001010000010111 the data of the data field of the password data is: 01001101010110010110010111010010 the compressed data is: 0001011001011010

Furthermore, in the case that a bit length of the second data is different from a bit length of the data of the data field, the process includes following steps:

1) the display screen is controlled to display that the password is generated unsuccessfully in the case that the second data is longer than the data of the data field of the password data.

2) Zero is put at the right of the second data to make the bit length of the second data equals to the bit length of the data of the data field of the password data in the case that the data of the data field of the password data is longer than the second data.

In the present Embodiment 2, that the compressed data is formatted to obtain the dynamic password specifically includes: the compressed binary data is shown as decimal data which is made as the dynamic password.

For instance, the compressed data is 0001011001011010, then the compressed data is 0x165A in hexadecimal, and the compressed data is 5722 in decimal, thus, the display displays 5722.

Step i3, the current serial number is initialized as 0, the flow is finished.

Figure 4:
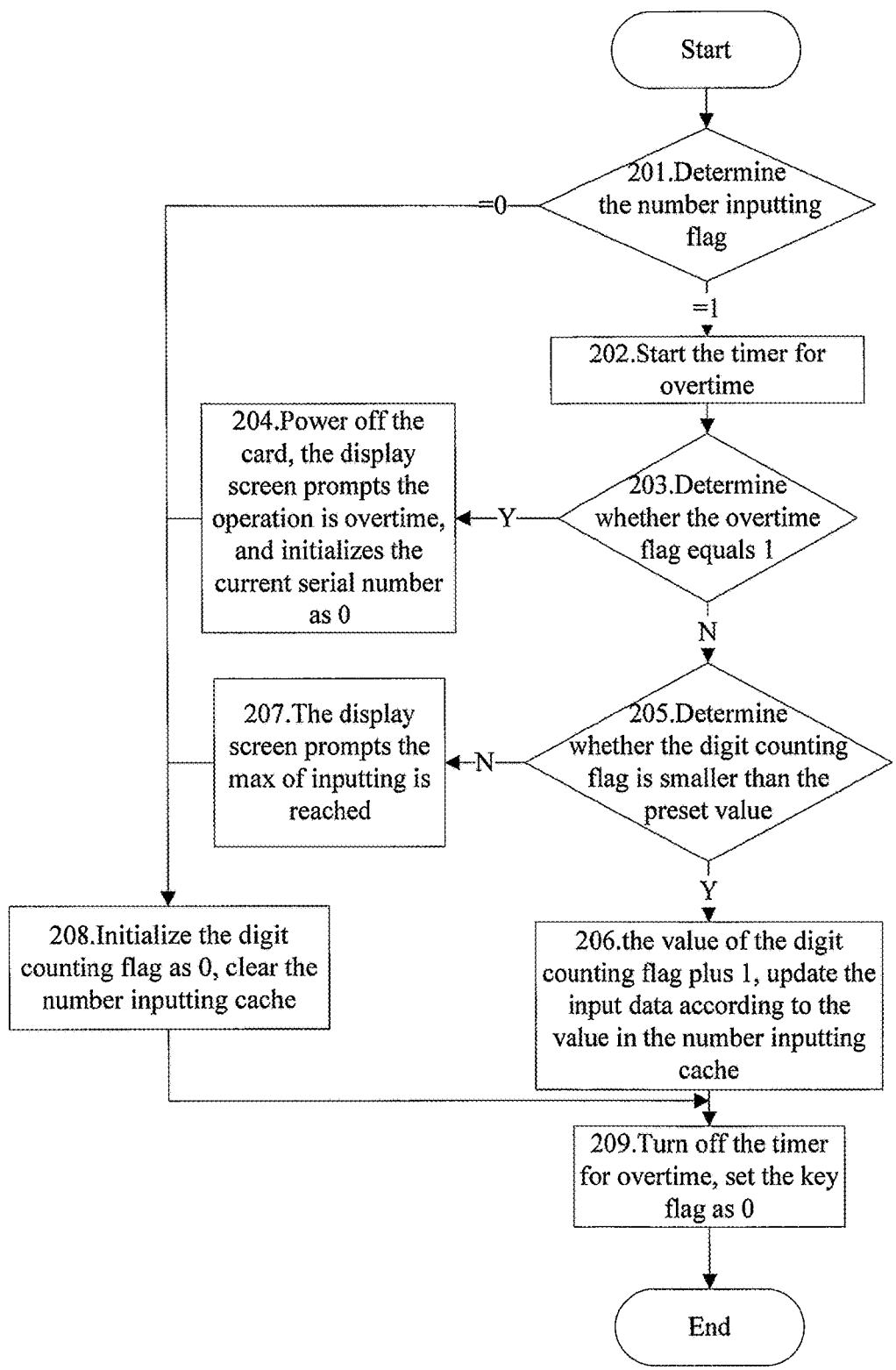
FIG. 4 is a flow chart of a number inputting processing flow in FIG. 1.

The number-inputting process flow in Step 5, as shown in FIG. 4, includes:

Step 201, the number-inputting flag is determined, Step 202 is executed in the case that the number-inputting flag is 1; Step 208 is executed in the case that the number-inputting flag is 0;

Step 202, a timer for overtime is started;

specifically, an overtime flag is set as 1 in the case that the timer for overtime reach a time of overtime for a key operation; otherwise, the overtime flag is defaulted as 0.

Step 203, whether the overtime flag is 1 is determined, if yes, Step 204 is executed; otherwise, Step 205 is executed;

Step 204, the card is powered off, the display screen is controlled to prompt the operation is overtime, and the current serial number is initialized as 0, and then Step 208 is executed;

Step 205, whether a digit counting flag is smaller than a preset value is determined, if yes, Step 206 is executed; otherwise, Step 207 is executed;

Step 206, 1 is added to the digit counting flag, and the input data is updated according to a value in the number inputting cache, and then Step 209 is executed;

Step 207, the display screen is controlled to prompt that a max of inputting is reached, and Step 208 is executed;

Step 208, the digit counting flag is initialized as 0, and the number inputting cache is cleared;

Step 209, the timer for overtime is turned off, a key flag is set as 0, and the flow is finished.

Figure 5:
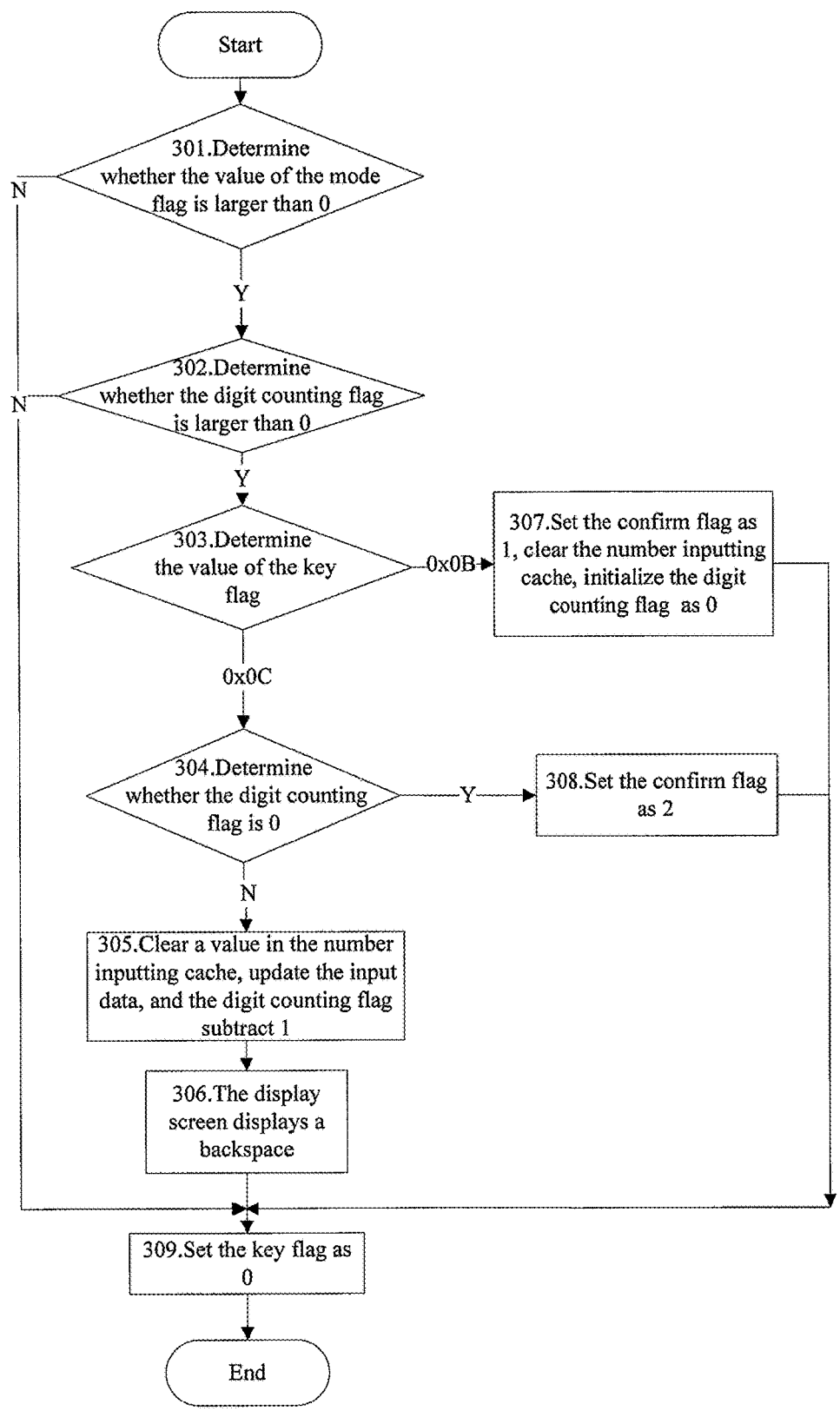
FIG. 5 is a flow chart of a state inputting processing flow in FIG. 1.

The state-inputting process flow in Step 6, as shown in FIG. 5, includes:

Step 301, whether a value of a mode flag is larger than 0 is determined, if yes, Step 302 is executed; otherwise, Step 309 is executed;

Step 302, whether the digit counting flag is larger than 0 is determined, if yes, Step 303 is executed; otherwise, Step 309 is executed;

Step 303, the value of the key flag is determined, Step 307 is executed in the case that the value of the key flag is 0x0B; Step 304 is executed in the case that the value of the key flag is 0x0C;

Step 304, whether the digit counting flag is 0 is determined, if yes, Step 308 is executed; otherwise, Step 305 is executed;

Step 305, the value of the number inputting cache is cleared, the input data is updated, and 1 is subtracted from the digit counting flag;

specifically, a value saved lastly is cleared firstly, and then the input data is updated by using data in the number inputting cache.

Step 306, the display screen is controlled to display a backspace, and then Step 309 is executed.

Step 307, the confirm flag is set as 1, the number inputting cache is cleared, the digit counting flag is initialized as 0, and then Step 309 is executed.

Step 308, the confirm flag is set as 2, and then Step 309 is executed.

Step 309, the key flag is set as 0, and the flow is finished.

Embodiment 3

Embodiment 3 provides a card-based device for generating a dynamic password, and the device includes keys and a display screen, the keys mainly include number keys (0-9) and state keys (a Cancel key and an OK key), and the device further includes following functional modules:

an initializing module, which is configured to initialize a current state as the first state after the device is powered on;

a first determining module, which is configured to determine an operation to be performed, determine whether it needs to input a number, and determine whether it needs to input a confirm state;

a first processing module, which is configured to obtain input data according to the operation on the number keys pressed down by a user in the case that the first determining module determines the operation to be performed is an operation on number keys and it needs to input numbers; obtain the confirm state according to the operation on the state keys pressed down by the user in the case that the first determining module determines that the operation to be performed is an operation on state keys and it needs to input the confirm state;

a second determining module, which is configured to determine the current running state in the case that the first determining module determines that the operation to be performed is neither the operation on number keys nor the operation on state keys;

a second processing module, which is configured to power on the card in the case that the second determining module determines that the current running state is the first state, to send a preset instruction to the card after the card is powered on successfully, and to obtain a first data and a second data from a first returned data returned from the card and save the first data and the second data, and to update the current running state as a sixth state;

a third processing module, which is configured to prompt the user to input a PIN code in the case that second determining module determines that the current running state is the sixth state, and to store the current input data, which is obtained by the first processing module, as the PIN code and update the current running state as a seventh state in the case that the current confirm state obtained by the first processing module is OK;

a fourth processing module, which is configured to obtain the stored PIN code in the case that the second determining module determines that the current running state is the seventh state, and generate a verifying-PIN-code instruction and send the instruction to the card, and to update the current running state as an eighth state when the PIN code is verified successfully by the card;

a fifth processing module, which is configured to generate a dynamic password generating instruction according to the saved first data and data stored in the preset cache and send the dynamic password generating instruction to the card in the case that the second determining module determines that the current running state is the eighth state, and to obtain the password data from a second returned data returned by the card and verify the password data, and to update the current running state as a ninth state in the case that the password data is verified successfully;

a sixth processing module, which is configured to compress the password data according to the saved second data in the case that the second determining module determines that the current running state is the ninth state, and format the compressed data to obtain a dynamic password, and display the dynamic password, power off the card, and initialized the current running state as the first state, in which, the first determining module determines the operation on the number keys or on the state keys via an interrupt module and an interrupt processing module as following:

the interrupt module is configured to check whether any key is pressed down, set a key IO interrupt flag in the case that any key is pressed down; the interrupt processing module is configured to check whether a key IO interrupt flag is set, set a value of a key flag according to keys pressed down by the user in the case that the key IO interrupt is set, and write a value into a number inputting cache according to the value of the key flag, and reset the key IO interrupt flag.

correspondingly, the first determining module specifically is configured to determine the value of the current key flag, and determine that the operation to be performed is the operation on number keys in the case that the value of the key flag belongs to a first preset scope; and determine that the operation to be performed is the operation on state keys in the case that the value of the key flag belongs to a second preset scope, in which, the function of the first processing module is realized as following:

the first processing module is specifically configured to determine whether the digit counting flag is smaller than a preset value in the case that the first determining module determines that the operation to be performed is the operation on number keys and it needs to input a number, if yes, 1 is added to the value of the digit counting flag, and the input data is updated according to the value of the number inputting cache; otherwise, control the display screen to prompt a max for inputting is reached, initialize the digit counting flag as an initial value, and clear the number inputting cache, and set the key flag as a default value.

Correspondingly, the initializing module is configured to initialize the digit counting flag as the initial value; the first determining module is configured to determining whether the number inputting flag is set, if yes, it needs to input a number; otherwise, it does not need to input a number; for example, the initial value is 0, and the default value is 0.

Furthermore, the function of the first processing module is realized as follow:

The first processing module is specifically configured to determine the value of the key flag in the case that the first determining module determines that the operation to be performed is the operation on state keys and it needs to input the confirm state, set the confirm flag as a first value in the case that the value of the key flag is a fifth preset value, clear the number inputting cache, initialize the digit counting flag as the initial value and set the key flag as the default value; determine whether the digit counting flag is the initial value in the case that the value of the key flag is a sixth preset value, if yes, set the confirm flag as a third value and set the key flag as the default value, otherwise, clear a value in the number inputting cache, and update the input data, and 1 is subtract from the value of the digit counting flag, and the display screen is controlled to display a backspace, and set the key flag as the default value.

Correspondingly, the initializing module is configured to initialize the number inputting flag as a second value, initialize the digit counting flag as the initial value; the first determining module is further configured to determine whether the digit counting flag is larger than the initial value, if yes, it needs to input the confirm state; otherwise, it does not need input the confirm state. For example, the initial value is 0, the default value is 0, the first value is 1, the second value is 0 and the third value is 2.

The present Embodiment 3 provides a device for generating a dynamic password, which can just only support one dynamic password generating mode, the device described above is a device which just only supports a first preset mode, for a device which is only just supports a second preset mode, the device for generation a dynamic password mainly includes: the initializing module, the first determining module, the first process module, the second determining module, the second processing module, the third processing module, the fourth processing module, the fifth processing module, the sixth processing module and a seventh processing module; comparing to the device for generating a dynamic password, which just only supports the first preset mode, the device which just only support the second preset mode further includes the seventh processing module, and the function of the second processing module is changed as follow:

the seventh processing module is configured to prompt the user to input a challenge code in the case that the second determining module determine that the current running state is a second state, and to obtain the input data and store the input data into the preset cache in the case that the confirm state is OK, and to update the current running state as the sixth state;

the second processing module is specifically configured to power on the card in the case that the second determining module determines the current running state is the first state, and send the preset instruction to the card in the case that the card is powered on successfully, and obtain the first data and the second data from the first returned data returned by the card and save the first data and the second data, and update the current running state as the second state.

Furthermore, the device for generating a dynamic password, which just only supports a third preset mode, mainly includes: the initializing module, the first determining module, the first processing module, the second determining module, the second processing module, the third processing module, the fourth processing module, the fifth processing module, the sixth processing module, the seventh processing module, an eighth processing module and a ninth processing module; comparing to the device for generating a dynamic password, which just only supports the second preset mode, the device, which just only supports the third preset mode, further includes the eighth processing module and the ninth processing module, and the functions of the second processing module and the seventh processing module are changed, more details is described as follow:

the eighth processing module is configured to determine whether a currency flag is set in the case that the second determining module determines that the current running state is a third state, if yes, prompt the user to input a currency serial number, and obtain the input data and store the data into the preset cache in the case that the confirm state is OK, and update the current running state as a fourth state; otherwise, update the current running state as the fourth state;

the ninth processing module is configured to prompt the user to input an amount of money in the case that the second determining module determines that the current running state is the fourth state, and obtain the input data and store the input data into the preset cache in the case that the confirm state is OK, and update the current running state as the sixth state;

the second processing module is configured to power on the card in the case that the second determining module determines that the current running state is the first state, and send the preset instruction to the card in the case that the card is powered on successfully, and obtain the first data and the second data from the first returned data returned by the card and save the first data and the second data, and set the currency flag according to the first returned data returned by the card, and set the current running state as the second state;

the seventh processing module is configured to prompt the user to input the challenge code in the case that the second determining module determines that the current running state is the second state, and obtain the input data and store the input data into the preset cache in the case that the confirm state is OK, and update the current running state as the third state.

Furthermore, the device for generating a dynamic password, which just only supports a fourth preset mode, mainly includes: the initializing module, the first determining module, the first processing module, the second determining module, the second processing module, the third processing module, the fourth processing module, the fifth processing module, the sixth processing module and a tenth processing module; comparing to the device which just only supports the first preset mode, the device, which just only supports the fourth preset mode, further includes the tenth processing module, and the function of the second processing module is changed, more details will be given as follow:

the tenth processing module is configured to prompt the user to input a signature value in the case that the second determining module determines that the current running state is a fifth state, and obtain the input data and store the input data into the preset cache in the case that the confirm state is OK, and update the current running state as the sixth state;

the second processing module is configured to power on the card in the case that the second determining module determines that the current running state is the first state, and send the preset instruction to the card in the case that the card is powered on successfully, and obtain the first data and the second data from the first returned data returned from the card and save the first data and the second data, and update the current running state as the fifth state.

The present Embodiment 3 provides a device for generating a dynamic password, which can support any one mode of the above four modes, in which, that the second processing module obtaining the first data and the second data from the first returned data returned by the card and saving the first data and the second data specifically includes: the first data is obtained according to a first identifier and a second identifier in the first returned data which is returned by the card, and the first data is saved, and the second data is obtained according to a third identifier and the second data is saved.

Furthermore, the second processing module is specifically configured to determine whether the card is powered on successfully, send the preset instruction to the card in the case that the card is powered on successfully, and parse the first returned data returned by the card, and obtain the first data according to the first identifier and the second identifier in the first returned data returned by the card and save the first data, and obtain the second data according to the third identifier and save the second data, and update the current running state as the sixth state; control the display screen to display that the operation of the card is an error in the case that the card is powered on unsuccessfully, and initialize the current running state as the first state.

Furthermore, the third processing module is configured to prompt the user to input the PIN code in the case that the second determining module determines that the current running state is the sixth state, and set the number inputting flag, and determines the confirm flag, reset the number inputting flag if the confirm flag is the first value, and record the input data as the PIN code, and update the current running state as the seventh state; and control the display screen to display the inputting fails if the confirm flag is a third value, and power off the card, and initialize the current running state as the first state.

the fourth processing module is specifically configured to obtain the stored PIN code in the case that the second determining module determines that the current running state is the seventh state, and generate a verifying-PIN-code instruction and send the instruction to the card, and determine whether the PIN code is verified successfully, if yes, update the current running state as the eighth state; otherwise, control the display screen to display the operation of the card is an error, and initialize the current running state as the first state.

the fifth processing module is specifically configured to generate the dynamic password generating instruction according to the saved first data and the data stored in the preset cache and send the dynamic password generating instruction to the card in the case that the second determining module determines that the current running state is the eighth state, and obtain the password data from the second returned data returned by the card and verify the password data, and determine whether the password data is verified successfully, if yes, update the current running state as a ninth state; otherwise, control the display screen to display the operation of the card is an error, and initialize the current running state as the first state.

the sixth processing module is specifically configured to choose a bit value corresponding to a bit address from the data of the data field of the password data according to the bit address, whose median is 1, in the saved second data, so as to recombine a binary number, and change the binary number to a decimal number, and make the decimal number as the dynamic password, and control the display screen to display the dynamic password, and power off the card, and initialize the current running state as the first state; or the sixth processing module is specifically configured to compare a length of the second data with a length of the data of data field of the password data, control the display screen to prompt that the password is generated unsuccessfully in the case that the second data is longer than the data of data field of the password data; fill zero to the right of the second data to make data whose length equals the length of the data of data field of the password data in the case that the data of data field of the password data is longer than the second data, and then choose the bit value corresponding to the bit address according to the bit address, whose median is 1, in the saved second data to recombine a binary number, and change the binary number to a decimal number, and make the decimal number as the dynamic password, and control the display screen to display the dynamic password, and power off the card, and initialize the current running state as the first state;

the seventh processing module is configured to prompt the user to input a challenge code in the case that the second determining module determines that the current running state is the second state, and set the number inputting flag, determine the confirm flag, and reset the number inputting flag in the case that the confirm flag equals the first value, and make the input data as the challenge code and store the challenge code into the preset cache, and update the current running state as the sixth state; control the display screen to display that the inputting fails in the case that the confirm flag equals the third value, power off the card, and initialize the current running state as the first state; or the second processing module is specifically configured to power on the card in the case that the second determining module determines the current running state is the first state, send the preset instruction to the card in the case that the card is powered on successfully, and obtain the first data and the second data from the first returned data returned from the card and save the first data and the second data, and determine whether any currency label in the first returned data, if yes, set the currency flag and update the current running state as the second state; otherwise, reset the currency flag and update the current running state as the second state.

Correspondingly, the eighth processing module is specifically configured to determine whether the currency flag is set when the second determining module determines the current running state is the third state, if yes, prompt the user to input the currency serial number, set the number inputting flag, and determine the confirm flag, set the number inputting flag in the case that the confirm flag equals the first value, and make the input data as a type of the currency and store the input data into the preset cache, and update the current running state as the fourth state; control the display screen to display the inputting fails in the case that the confirm flag equals the third value, and power off the card, and initialize the current running state as the first state.

the ninth processing module is specifically configured to prompt the user to input the amount of money in the case that the second determining module determines the current running state is the fourth state, set the number inputting flag, and determine the confirm flag, reset the number inputting flag in the case that the confirm flag equals the first value, and make the input data as the amount of money and store the amount of money into the preset cache, and update the current running state as the sixth state; control the display screen to display that inputting fails in the case that the confirm flag equals the third value, and power off the card, and initialize the current running state as the first state.

The tenth processing module is specifically configured to prompt the user to input a signature value in the case that the second determining module determines that the current running state is the fifth state, and set the number inputting flag, and determine the confirm flag, reset the number inputting flag in the case that the confirm flag equals the first data, and make the input data as the signature value and store the signature value into the preset cache, and update the current running state as the sixth state; control the display screen to display that inputting fails in the case that the confirm flag equals the third value, power off the card and initialize the current running state as the first state.

Furthermore, on a multi-mode-based device for generating a dynamic password, the user can choose the dynamic password generating mode by setting a mode key on the device, for instance, the device further includes a first preset mode key and a second preset mode key, which is configured to be chosen for the user to choose a dynamic password generating mode. Correspondingly, the realization of functions of the functional modules of the device are changed as follow:

in which, the initializing module is further configured to control the display screen to prompt the user to press down a mode key after the device is powered on; the second determining module is further configured to continue to determine the operation to be executed in the case that the second determining module determines that the value of key flag belongs to the third preset scope. For example, the value of the key flag corresponding to the first preset mode key is 0xA1, and the value of the key flag corresponding to the second preset mode key is 0xA2, correspondingly, the third preset scope is from 0xA1 to 0xA2.

Furthermore, the interrupt processing module is further configured to set the value of the mode flag according to the value of the key flag, for instance, the value of the key flag is 0xA1, thus, the value of the mode flag is set as 0xA1. Correspondingly, the initializing module is further configured to initialize the corresponding relation between the value of the mode flag and the collection of running states, and a corresponding collection of running states is obtained according to the mode flag when a mode key is pressed down; and the initializing module is further configured to initialize the current running state in each collection of running states as the first state; and the second determining module is specifically configured to determine the current running state in the collection of running states obtained the initializing module.

For example, the initializing module is specifically configured to initialize the collection of running states, which corresponds to the mode flag whose value is the first preset value, as the collection including the first state, the sixth state, the seventh state, the eighth state and the ninth state, and/or initialize the collection of running states, which corresponds to the mode flag whose value is the second preset value, as the collection including the first state, the second state, the sixth state, the seventh state, the eighth state and the ninth state, and/or initialize the collection, which corresponds to the mode flag whose value is the third preset value, as the collection including the first state, the second state, the third state, the fourth state, the sixth state, the seventh state, the eighth state and the ninth state, and/or initialize the collection of running states, which corresponds to the mode flag whose value is the fourth preset value, as the collection including the first state, the fifth state, the sixth state, the seventh state, the eighth state and the ninth state.

The present invention provides a card-based device for generating a dynamic password, and the password data is generated by combining with the internal data in the card and the data input by the user and is returned to the device, in this way, the password data is formed to protect from being manipulated to make the generation of a dynamic password more secure.

While the preferred embodiments of the present invention have been shown and described herein. It will be obvious that such embodiments are provided by way of examples only. Numerous variations, changes, and substitutes will occur to those skilled in the art without departing from the concept of the present invention. It is intended that the appended claims define the scope of protection of the present invention.

The invention claimed is:

1. A card-based method for generating a dynamic password, in which the card is inserted into a device, wherein the method comprises:
  Step S1, powering on the device, and initializing a current running state as a first state;
  Step S2, determining, by the device, an operation which is to be executed, executing Step S3 in the case that the operation is on number keys; executing Step S4 in the case that the operation is on state keys; otherwise, executing Step S5;
  Step S3, determining, by the device, whether it needs to input numbers, if yes, obtaining input data according to the operation on number keys pressed by a user, and then returning to execute Step S2; otherwise, returning to Step S2 directly;
  Step S4, determining, by the device, whether it needs to input a confirm state, if yes, obtaining the confirm state according to the operation on state keys pressed down by the user, and then returning to execute Step S2; otherwise, returning to Step S2 directly; and
  Step S5, determining, by the device, the current running state;
  powering on the card in the case that the current running state is the first state, sending a preset instruction to the card after the card is powered on successfully, and obtaining a first data and a second data from a first returned data returned from the card and saving the first data and the second data, updating the current running state as a sixth state, and then returning to execute Step S2;

prompting the user to input a PIN code in the case that the current running state is the sixth state, storing the input data as the PIN code when the confirm state is OK, updating the current running state as a seventh state, and returning to Step S2;

obtaining the stored PIN code in the case that the current running state is the seventh state, generating a verifying-PIN-code instruction and sending the instruction to the card, updating the current state as an eighth state after the card verifies the PIN code successfully, and then returning to Step S2;

generating a password-generating instruction and sending the instruction to the card according to the saved first data and data stored in a preset cache in the case that the current running state is the eighth state, obtaining password data from a second returned data returned from the card and verifying the password data, updating the current running state as a ninth state after the obtained password data is verified successfully, and then returning to Step S2; and compressing the password data according to the saved second data in the case that the current running state is the ninth state, formatting the compressed data so as to obtain a dynamic password, displaying the dynamic password, powering off the card, initializing the current running state as the first state, and returning to Step S2, said method further comprises a key interrupt flow and an interrupt processing flow, and the key interrupt flow specifically comprises: entering a key interrupt in the case that a key is pressed down, setting a key-IO-interrupt flag, and exiting from the key interrupt; the interrupt processing flow specifically comprises: entering an interrupt processing in the case that the key-IO-interrupt flag is set, setting a value of a key flag according to key input by the user, and writing a value into a number inputting cache according to the value of the key flag, clearing the key-IO-interrupt flag, and then exiting from the interrupt processing.

2. The method as claimed in claim 1, wherein Step S2 specifically comprises:

determining, by the device, the value of the key flag, making sure that the operation, which is to be executed, is the operation on number keys in the case that the value of the key flag belongs to a first preset scope, and executing Step S3; making sure that the operation, which is to be executed, is the operation on state keys in the case that the value of the key flag belongs to a second preset scope, and executing Step S4; otherwise, executing Step S5;

Step S1 further comprises: determining the value of the key flag, executing Step S2 in the case that the value of the key flag belongs to a third preset scope; prompting the user to press a state key in the case that the value of the key flag is other values.

3. The method as claimed in claim 1, wherein the interrupt processing flow further comprises: setting a value of a mode flag according to the value of the key value;

Step S1 further comprises: initializing a corresponding relation between the value of the mode flag and the collection of running states, prompting the user to press down a mode key, and then obtaining a collection of running states, which corresponds to the mode flag, according to the mode flag when the mode key is pressed down, and then executing Step S2;

initializing the current running state as the first state in Step S1 specifically comprises: initializing the current running state in each of the collection of running states as the first state; and determining the current running state in Step S5 specifically comprises: determining the current running state in each of the collection of running states.

4. The method as claimed in claim 3, wherein, initializing the corresponding relation between the value of the mode flag and the collection of running states specifically comprises: initializing a collection of running states, which corresponds to the mode flag whose value is a first preset value, as a collection comprising the first state, the sixth state, the seventh state, the eighth state and the ninth state; and/or initializing the collection of running states, which corresponds to the mode flag whose value is a second preset value, as a collection comprising the first state, a second state, the sixth state, the seventh state, the eighth state and the ninth state; initializing the collection of running states, which corresponds to the mode flag whose value is a third preset value, as a collection comprising the first state, the second state, a third state, a fourth state, the sixth state, the seventh state, the eighth state and the ninth state; and/or, initializing the collection of running states, which corresponds to the mode flag whose value is a fourth preset value, as a collection comprising the first state, a fifth state, the sixth state, the seventh state, the eighth state and the ninth state.

5. The method as claimed in claim 1, wherein, after the current running state is determined, the method further comprises:

prompting the user to input a challenge code in the case that the current running state is the second state, and obtaining input data and storing the input data into a preset cache in the case that the confirm state is OK, and updating the current running state as the sixth state, and then returning to execute Step S2;

correspondingly, updating the current running state as the sixth state is replaced with updating the current running state as the second state in the case that the current running state is the first state, the method further comprises setting a currency flag according to a first returned data returned by the card in the case that the current running state is the first state;

after the current running state is determined, the method further comprises:

determining whether the currency flag is set in the case that the current running state is a third state, if yes, prompting the user to input a currency serial number, and obtaining the input data when the confirm state is OK, and storing the input data into the preset cache, updating the current running state as a fourth state, and then returning to Step S2; otherwise, updating the current running state as the fourth state, and then returning to Step S2;

prompting the user to input an amount of money in the case that the current running state is the fourth state, obtaining the input data and storing the input data into the preset cache when the confirm state is OK, updating the current running state as the sixth state, and returning to Step S2;

correspondingly, updating the current running state as the sixth state is replaced with updating the current running state as the third state when the current running state is determined as the second state.

6. The method as claimed in claim 1, wherein, after the current running state is determined, the method further comprises:
prompting the user to input a signature value in the case that the current running state is a fifth state, obtaining the input data and storing the data into the preset cache when the confirm state is OK, updating the current running state as the sixth state, and then returning to Step S2;
correspondingly, updating the current running state as the sixth state is replaced with updating the current running state as the fifth state in the case that the current running state is the first state.

7. The method as claimed in claim 1, wherein, obtaining the first data and the second data from the first returned data returned by the card and saving the first data and the second data specifically comprises: parsing the first returned data returned by the card, obtaining the first data according to a first identifier and a second identifier in the first returned data, and saving the first data, and obtaining the second data according to a third identifier and saving the second data.

8. The method as claimed in claim 1, wherein, compressing the password data according to the saved second data and formatting the compressed data to obtain the dynamic password specifically comprises: choosing a bit value corresponding to a bit address from data of data field of the password data according to the bit address whose median is 1 in the second data, so as to recombine a binary number, and transforming the binary number into a decimal number, and making the decimal number as the dynamic password.

9. The method as claimed in claim 8, wherein before the password data is compressed, the method further comprises: comparing a length of the second data with a length of the data of data field of the password data, prompting the password is generated unsuccessfully in the case that the second data is longer than the data of data field of the password data; filling zero on the right of the second data to make the length of the second data equals the length of the data of data field of the password data in the case that the data of data field of the password data is longer than the second data.

10. A card-based device for generating a dynamic password, in which the device comprises keys and a display screen, wherein the device further comprises:
an initializing module configured to initialize a current running state as a first state after the device is powered on;
a first determining module configured to determine an operation which to be executed, and determine whether it needs to input numbers, and determine whether it needs to input a confirm state;
a first processing module configured to obtain input data according to the operation on the number keys pressed by an user when the first determining module determines that the operation, which is to be executed, is on number keys and it needs to input numbers; and obtain the confirm state according to the operation on the state keys pressed by the user when the first determining module determines that the operation to be executed is on state keys and it needs to input the confirm state;
a second determining module, which is configured to determine the current running state when the first determining module determines that the operation to be executed is neither on inputting number keys nor on state keys;
a second processing module configured to power on the card when the second determining module determines that the current running state is the first state, send a preset instruction to the card in the case that the card is powered on successfully, and obtain the first data and the second data from the first returned data returned by the card and save the first data and the second data, and update the current running state as the sixth state;
a third processing module configured to prompt the user to input a PIN code when the second determining module determines that the current running state is the sixth state, and store the current input data obtained by the first processing module as the PIN code when the current confirm state obtained by the first processing module is OK, and update the current running state as the seventh state;
a fourth processing module configured to obtain the stored PIN code when the second determining module determines that the current running state is the seventh state, generate the verifying-PIN-code instruction and send the instruction to the card, and update the current running state as the eighth state after the PIN code is verified successfully by the card;
a fifth processing module configured to generate a password-generating instruction according to the saved first data and the data stored in the preset cache and send the instruction to the card when the second determining module determines that the current running state is the eighth state, obtain the password data from the second returned data returned by the card and verify the password data, and update the current running state as the ninth state after the password data is verified successfully; and
a sixth processing module configured to compress the password data according to the saved second data in the case that the second determining module determines that the current running state is the ninth state, and format the compressed data so as to obtain a dynamic password, display the dynamic password, power off the card, and initialize the current running state as the first state,
the device further comprises an interrupt module and an interrupt processing module;
the interrupt module is configured to check whether any key is pressed down, and set the key-IO-interrupt flag in the case that any key is pressed down; and
the interrupt processing module is configured to check whether the key-IO-interrupt flag is set, set the value of the key flag according to the key input by the user in the case that the key-IO-interrupt is set, and write a value into the number inputting cache according to the value of the key flag, and reset the key-IO-interrupt flag.

11. The device as claimed in claim 10, wherein, the first determining module is specifically configured to determine the value of the key flag, in which the operation to be executed is on number keys in the case that the value of the key flag belongs to the first preset scope; the operation to be executed is on state keys in the case that the value of the key flag belongs to the second preset scope; and
the first determining module is further configured to execute the operation to be executed in the case that the value of the key flag belong to the third preset scope.

12. The device as claimed in claim 10, wherein, the interrupt processing module is further configured to set the value of the mode flag according to the value of the key flag;
the initializing module is further configured to initialize the corresponding relation between the value of the mode flag and the collection of running states, control the display screen to prompt the user to press down a mode key; and obtain a collection of running states corresponding to the mode flag in the case that a mode key is pressed down;

the initializing module is further configured to initialize the current running state in each of the collection of running states as the first state; and the second determining module is further configured to determine the current running state in the collection of running states obtained by the initializing module.

13. The device as claimed in claim 12, wherein the initializing module is specifically configured to initialize the collection of running states, corresponding to the mode flat whose value is the first preset value, as a collection which includes the first state, the sixth state, the seventh state, the eighth state and the ninth state; initialize the collection of running states, corresponding to the mode flat whose value is the second preset value, as a collection which includes the first state, the second state, the sixth state, the seventh state, the eighth state and the ninth state; initialize the collection of running states, corresponding to the mode flag whose value is the third preset value, as a collection which includes the first state, the second state, the third state, the fourth state, the sixth state, the seventh state, the eighth state and the ninth state; and/or, initialize a collection of running states, corresponding to the mode flag whose value is the fourth preset state, as a collection which includes the first state, the fifth state, the sixth state, the seventh state, the eighth state and the ninth state.

14. The device as claimed in claim 10, wherein the device further comprises a seventh processing module which is configured to prompt the user to input a challenge code in the case that the second determining module determines that the current running state is the second state, and obtain the input data and store the input data into the preset cache in the case that the confirm state is OK, and update the current running state as the sixth state;

the second processing module, which is specifically configured to power on the card in the case that the second determining module determines that the current running state is the first state, send the preset instruction to the card in the case that the card is powered on successfully, and obtain the first data and the second data from the first returned data returned by the card and save the first data and the second data, and set the currency flag according to the first returned data returned by the card, and update the current running state as the second state;

the device further comprises an eighth processing module, which is configured to determine whether the currency flag is set in the case that the second determining module determines that the current running state is the third state, if yes, prompt the user to input the currency serial number, and obtain the input data and store the input data into the preset cache in the case that the confirm state is OK, and update the current running state as the fourth state; otherwise, update the current running state as the fourth state;

the device further comprises a ninth processing module, which is configured to prompt the user to input the amount of money in the case that the second determining module determines that the current running state is the fourth state, obtain the input data and store the input data into the preset cache in the case that the confirm state is OK, and update the current running state as the sixth state;

the seventh processing module is specifically configured to prompt the user to input the challenge code in the case that the second determining module determines that the current running state is the second state, and obtain the input data and store the input data into the preset cache in the case that the confirm state is OK, and update the current running state as the third state.

15. The device as claimed in claim 10, wherein the device further comprises a tenth processing module, which is configured to prompt the user to input the signature value in the case that the second determining module determines that the current running state is the fifth state, and obtain the input data and store the input data into the preset cache in the case that the confirm state is OK, and update the current running state as the sixth state;

the second processing module is specifically configured to power on the card in the case that the second determining module determines that the current running state is the first state, and send the preset instruction to the card when the card is powered on successfully, and obtain the first data and the second data from the first returned data returned by the card and save the first data and the second data, and update the current running state as the fifth state.

16. The device as claimed in claim 10, wherein, the second processing module is specifically configured to power on the card in the case that the second determining module determines that the current running state is the first state, and send the preset instruction to the card when the card is powered on successfully, and parse the first returned data returned by the card, and obtain the first data according to the first identifier and the second identifier in the first returned data returned by the card and save the first data, and obtain the second data according to the third identifier and save the second data, and update the current running state as the sixth state.

17. The device as claimed in claim 10, wherein the sixth processing module is configured to choose the bit value corresponding to the bit address, whose median is 1, in the second data from the data of data field of the password data according to the bit address to recombine the binary number in the case that the second determining module determines that the current running state as the ninth state, and transfer the binary number to a decimal number, and make the decimal number as the dynamic password, control the display screen to display the dynamic password, power off the card, and initialize the current running state as the first state.

18. The device as claimed in claim 17, wherein, the sixth processing module is configured to compare the length of the second data with the length of the data of data field of the password data in the case that the second determining module determines that the current running state is the ninth state, control the display screen to prompt the password is generated unsuccessfully in the case that the second data is longer than the data of data field of the password data; fill one or more zeros on the right of the second data to make the length of the second data equal the length of the data of data field of the password data in the case that the data of data field of the password data is longer than the second data, and then choose the bit value corresponding to the bit address, whose median is 1, in the second data from the data of data field of the password data according to the bit address to recombine a binary number, and transfer the binary number to a decimal number, and make the decimal number as the dynamic password, control the display screen to display the dynamic password, power off the card, and initialize the current running state as the first state.

* * * * *